US011951424B2

(12) United States Patent
Shuster

(10) Patent No.: US 11,951,424 B2
(45) Date of Patent: Apr. 9, 2024

(54) SEA STRAINER

(71) Applicant: Miller-Leaman, Inc., Daytona Beach, FL (US)

(72) Inventor: Martin Joseph Shuster, Daytona Beach, FL (US)

(73) Assignee: Miller-Leaman, Inc., Daytona Beach, FL (US)

( * ) Notice: Subject to any disclaimer, the term of this patent is extended or adjusted under 35 U.S.C. 154(b) by 0 days.

(21) Appl. No.: 17/200,749

(22) Filed: Mar. 12, 2021

(65) Prior Publication Data

US 2021/0283535 A1 Sep. 16, 2021

Related U.S. Application Data

(60) Provisional application No. 62/988,517, filed on Mar. 12, 2020.

(51) Int. Cl.
| | |
|---|---|
| *B01D 29/66* | (2006.01) |
| *B01D 29/52* | (2006.01) |
| *B01D 29/56* | (2006.01) |
| *B01D 29/90* | (2006.01) |
| *B01D 35/12* | (2006.01) |
| *C02F 1/00* | (2023.01) |
| *C02F 103/08* | (2006.01) |

(52) U.S. Cl.
CPC ........... *B01D 29/668* (2013.01); *B01D 29/52* (2013.01); *B01D 29/56* (2013.01); *B01D 29/90* (2013.01); *B01D 35/12* (2013.01); *C02F 1/001* (2013.01); *C02F 2103/08* (2013.01)

(58) Field of Classification Search
CPC ...... B01D 29/668; B01D 29/56; B01D 29/90; B01D 35/12; C02F 1/001; C02F 2103/08; C02F 2303/24
See application file for complete search history.

(56) References Cited

U.S. PATENT DOCUMENTS

| | | | | |
|---|---|---|---|---|
| 5,705,065 | A * | 1/1998 | Sharpe | B01D 29/96 210/453 |
| 9,631,641 | B2 * | 4/2017 | Choi | F04D 29/708 |
| 2002/0008068 | A1 * | 1/2002 | Anderson | B01D 29/684 210/741 |
| 2004/0159617 | A1 * | 8/2004 | Benenson, Jr. | B01D 29/6476 210/791 |
| 2012/0000835 | A1 * | 1/2012 | Desai | B01D 35/12 210/323.1 |
| 2017/0050128 | A1 * | 2/2017 | Amaravadi | B01D 29/117 |
| 2021/0069619 | A1 * | 3/2021 | Ben Horin | B01D 29/15 |

* cited by examiner

*Primary Examiner* — Liam Royce
(74) *Attorney, Agent, or Firm* — Skaar Ulbrich Macari, P.A.

(57) ABSTRACT

A sea strainer can include multiple strainers in a configuration for operation to supply strained sea water to a vessel's engines and to perform backflushing of one of the strainers while another of the strainers continues to provide strained sea water to the vessel's engines. A flush pump can be provided to pump water through the strainer to be backflushed as part of the flushing operation.

18 Claims, 23 Drawing Sheets

Autonomous Marine Filter Flow
Valve Cycle Sequence

| | Operating state description | #1 | #2 | #3 | #4 | #5 | #6 | #7 | #8 | #9 | #10 | #11 | Flush Pump | Fire Pump |
|---|---|---|---|---|---|---|---|---|---|---|---|---|---|---|
| Fig. 15 | Filtration - Strainer #1 and Strainer #2 | Open | | | | | | | | | | | | |
| Fig. 16 | Rinse Strainer #1, Filtration Strainer #2 w/Flush Pump | | Open | | Open | Open | | Open | Open | | | | ON | |
| | Rinse Strainer #2, Filtration Strainer #1 w/Flush Pump | Open | Open | Open | | | Open | Open | Open | | | | ON | |
| Fig. 17 | Rinse #1 Strainer w/Fire Pump | Open | Open | | Open | | Open | | Open | | | | | ON |
| Fig. 18 | Rinse #2 Strainer w/Fire Pump | | Open | Open | Open | | Open | | Open | | | | | ON |
| | Rinse #1 & #2 Strainer w/Fire Pump | | Open | | | | | Open | | Open | | Open | | ON |
| Fig. 19 | Backflush #1 Strainer w/Fire Pump | Open | | | | Open | | | | Open | Open | Open | | ON |
| | Backflush #2 Strainer w/Fire Pump | Open | Open | | | | | | | Open | | Open | | ON |
| | Backflush #1 Strainer & #2 Strainer w/Fire Pump | | Open | | | | | | | | Open | Open | | ON |
| | Backflush #1 Strainer w/Flush Pump | Open | Open | | | | | | | | | Open | ON | |
| | Backflush #2 Strainer w/Flush Pump | Open | Open | | | | | | | | Open | | ON | |
| | Strainer Screen Element #1 BY-PASS | | Open | Open | | | Open | Open | | | | | | |
| | Strainer Screen Element #2 BY-PASS | | Open | Open | | | Open | Open | | | | | | |

FIG. 21

SEA STRAINER

PRIORITY

This application claims the benefit of U.S. Provisional Application Ser. No. 62/988,517, filed on Mar. 12, 2020, which is hereby incorporated herein by reference in its entirety.

FIELD

The present invention relates generally to automated sea strainers for removing suspended solids in a fluid stream.

BACKGROUND

Vessels that travel on the sea often use sea water for cooling of engines that drive the vessel. Sea water contains many particulates, of both organic and inorganic varieties. Sea strainers are used to remove these particulates that would otherwise foul and/or clog the cooling system, leading to engine failure. However, these sea strainers need to be cleaned of accumulated particulates from time to time. Cleaning the sea strainers is a particularly cumbersome task for large vessels that have large strainer systems given their large cooling needs.

There are several conventional strainer products on the market that attempt to provide an automatic cleaning of the sea strainer system. However, such systems typically suffer from the inability to automatically keep the strainer element clean due to inadequate removal of the particles/contaminants from the screening device or the mechanical failure of the cleaning mechanism itself.

For example, several commercially-available solutions include the use of suction-type scanners and/or brushes use to remove the particles from the strainers. These types of systems use a complicated drive mechanism comprising an electric or hydraulic motor in conjunction with a telescoping or ball screw type arrangement to drive the brushes or scanners or both. These types of strainer systems are prone to failure due to the particles in the feed stream interfering with the free movement of the system due to mechanical wear or jamming and ultimately failure of the cleaning mechanism.

Therefore, there is a continuing need to provide an automated sea straining system that addresses the deficiencies of the conventional systems as completely as possible.

SUMMARY

The present invention addresses the above-noted issues with conventional automated sea straining systems. A sea strainer can include multiple strainers in a configuration for operation to supply strained sea water to a vessel's engines and to perform backflushing of one of the strainers while another of the strainers continues to provide strained sea water to the vessel's engines. A flush pump can be provided to pump water through the strainer to be backflushed as part of the flushing operation.

The sea strainer system can include first and second strainer elements configured to operate in both forward flush and backflush modes. The strainer elements are arranged in a duplex configuration that allows the strainer to work in multiple different modes.

The strainer can be cleaned using an alternate seawater pump to create a forward flush in the strainers by pumping water through the strainer element on the inside (dirty side) of the filter which exceeds the demand required for the filtrate, thereby creating a constant hydrodynamic scrubbing to the inside walls of the strainer element.

In addition, clean filtered water can flow in reverse to backflush either strainer. This is accomplished by sequencing several valves to change the direction of flow to clean the strainer.

The system in certain examples comprises two or more filter elements, several two-way or three-way valves, pressure transducers and/or flow transmitters, an alternate flushing pump (controlled in some cases by a variable frequency motor) which can change the flow and pressure through the system to maximize the cleaning effect. This sequence can be triggered by a manual switch, time, differential pressure, change in flow, or a combination of these. The automation of the system is controlled by a PLC-type controller capable of utilizing several analog and digital inputs and outputs to control the sequence of events needed to automate the process. Additionally, the strainers can be soaked with a clean in place (CIP) protocol utilizing an injector pump to inject the cleaning solution to allow the strainers to be soaked periodically offline.

Another feature of certain embodiments of the sea strainer includes allowing filtered fluid flow downstream while the strainers are being cleaned either by a constant forward flush or by isolating one strainer at a time during the cleaning process whether by forward flushing or back-flushing.

The automated sea strainer has a reduced number of moving parts. With the exception of the valves, the cleaning of the strainer element is accomplished by the flow of the water. The hydrodynamic forces of the crossflow forward flush, and/or the backflush controlled by a PLC cleaning sequence helps facilitate the cleaning action. Thus, the need to manually clean the sea strainer(s) due to being fouled/clogged is greatly reduced by the automated process of crossflowing in combination with backflushing the strainer. Additionally, a soaking solution can be used to remove accumulated marine growth.

In one example, a sea strainer system includes a first strainer comprising a seawater inlet, a second strainer comprising a seawater inlet and a first cross-flow conduit coupled to each of the first and second strainers to fluidically couple together the first strainer and the second strainer. A first engine outlet conduit is coupled to the first strainer to receive strained sea water from the first strainer. A second engine outlet conduit is coupled to the second strainer to receive strained sea water from the second strainer. A first fluid control valve is disposed in the first engine outlet conduit to control a flow of the strained seawater from the first strainer. A second fluid control valve is disposed in the second engine outlet conduit to control a flow of the strained seawater from the second strainer. A third fluid control valve is disposed in the first cross-flow conduit to control water flow into and out of the first strainer via the first cross-flow conduit. A fourth fluid control valve is disposed in the first cross-flow conduit to control water flow into and out of the second strainer via the first cross-flow conduit.

A second cross-flow conduit can be coupled to each of the first and second strainers to fluidically couple together the first strainer and the second strainer. A backflush pump can be fluidically coupled to each of the first strainer and the second strainer via a first pump conduit coupled to the first cross-flow conduit and via a second pump conduit coupled to the second cross-flow conduit.

The first pump conduit can be coupled to the first cross-flow conduit at a location between the third fluid control valve and the fourth fluid control valve.

A fifth fluid control valve can be disposed in the second cross-flow conduit to control water flow into and out of the first strainer via the second cross-flow conduit. A sixth fluid control valve can be disposed in the second cross-flow conduit to control water flow into and out of the second strainer via the second cross-flow conduit. The second pump conduit can be coupled to the second cross-flow conduit at a location between the fifth fluid control valve and the sixth fluid control valve.

A variable speed drive can be coupled to the backflush pump.

A fire pump outlet can be disposed on the second cross-flow conduit.

A crossover conduit can be provided to fluidically connect the first engine outlet conduit to the second engine outlet conduit.

A seventh fluid control valve can be disposed in the crossover conduit to control water flow out of the first engine outlet conduit. An eighth fluid control valve can be disposed in the crossover conduit to control water flow out of the second engine outlet conduit.

At least one of the first and second strainers can comprise a window provided to a sidewall thereof to permit viewing of the interior condition of the strainer.

A programmable logic controller can be coupled to each of the first fluid control valve, the second fluid control valve, the third fluid control valve and the fourth fluid control valve to control opening and closing operation of the valves.

In another example, a sea strainer system can comprise a first strainer comprising a seawater inlet, a second strainer comprising a seawater inlet, and a cross-flow conduit coupled to each of the first and second strainers to fluidically couple together the first strainer and the second strainer. A first engine outlet conduit can be coupled to the first strainer to receive strained sea water from the first strainer. A second engine outlet conduit can be coupled to the second strainer to receive strained sea water from the second strainer. A first fluid control valve can be disposed in the first engine outlet conduit to control a flow of the strained seawater from the first strainer. A second fluid control valve can be disposed in the second engine outlet conduit to control a flow of the strained seawater from the second strainer. A third fluid control valve can be disposed in the first cross-flow conduit to control water flow into and out of the first strainer via the cross-flow conduit. A fourth fluid control valve disposed in the first cross-flow conduit to control water flow into and out of the second strainer via the cross-flow conduit. A trash pump or a flush tank can be coupled to the cross-flow conduit to supply flush water for back flushing one or both of the first strainer and the second strainer with raw seawater.

The trash pump or a flush tank can be coupled to the cross-flow conduit at a location between the third fluid control valve and the fourth fluid control valve.

A crossover conduit can fluidically connect the first engine outlet conduit to the second engine outlet conduit.

A fifth fluid control valve can be disposed in the crossover conduit to control water flow to the first engine outlet conduit. A sixth fluid control valve can be disposed in the crossover conduit to control water flow to the second engine outlet conduit.

In a further example, a method of operating a sea strainer can include supplying strained sea water to a first engine feed conduit and a second engine feed conduit from a first strainer while a second strainer is fluidically isolating a second strainer from the first engine feed conduit and the second engine feed conduit, simultaneously with the step of supplying strained sea water to a first engine feed conduit and a second engine feed conduit, supplying strained sea water to a flush pump, and pumping the strained sea water with the back flush pump through the second strainer to back flush the second strainer.

The strained sea water used to back flush the second strainer can exit the second strainer via a raw water inlet of the second strainer.

The step of fluidically isolating the second strainer from the first engine feed conduit and the second engine feed conduit can include closing a first fluid control valve disposed in a crossover conduit that fluidically connects first engine feed conduit to the second engine feed conduit, and closing a second fluid control valve in a cross-flow conduit that fluidically connects first strainer to the second strainer.

After the second strainer has been back flushed, the method can further include opening the first fluid control valve disposed in the crossover conduit that fluidically connects first engine feed conduit to the second engine feed conduit, closing a third fluid control valve in the cross-flow conduit that fluidically connects the first strainer to the second strainer, and turning off the flush pump.

The features of various embodiments of the sea strainer can also be applied to any other system which needs suspended solids to be removed from the fluid stream. Thus, the invention can be adapted to other applications other than the marine applications of the examples discussed herein.

The above summary is not intended to limit the scope of the invention, or describe each embodiment, aspect, implementation, feature or advantage of the invention. The detailed technology and preferred embodiments for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

BRIEF DESCRIPTION OF THE DRAWINGS

FIG. 21 is a diagram showing certain operating states and valve positions corresponding to each indicated state.

Figure 1:
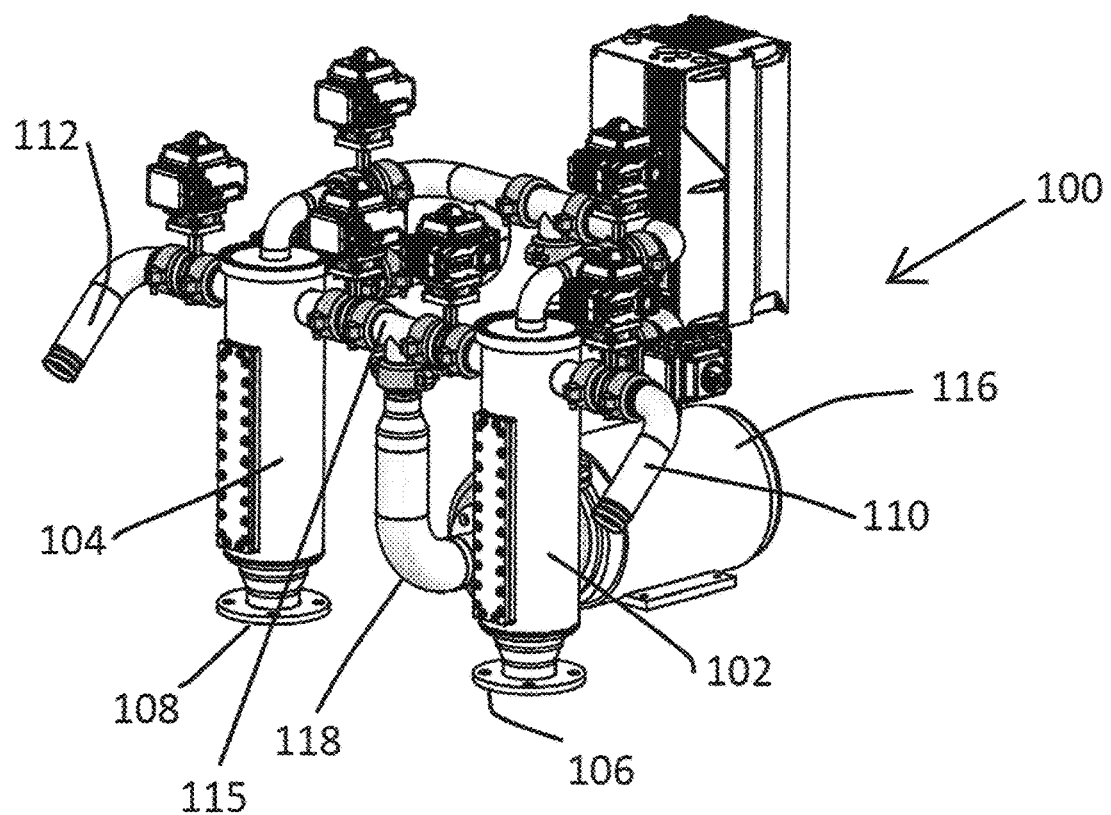
FIG. 1 is a perspective view of a sea strainer system in accordance with certain example embodiments.
Figure 2:
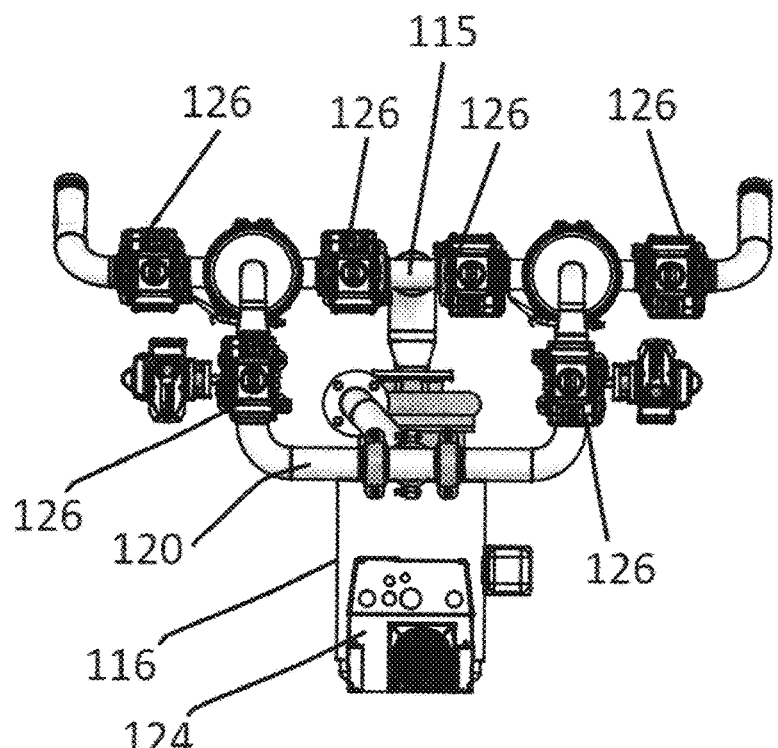
FIG. 2 is a top view of a sea strainer system in accordance with certain example embodiments.
Figure 3:
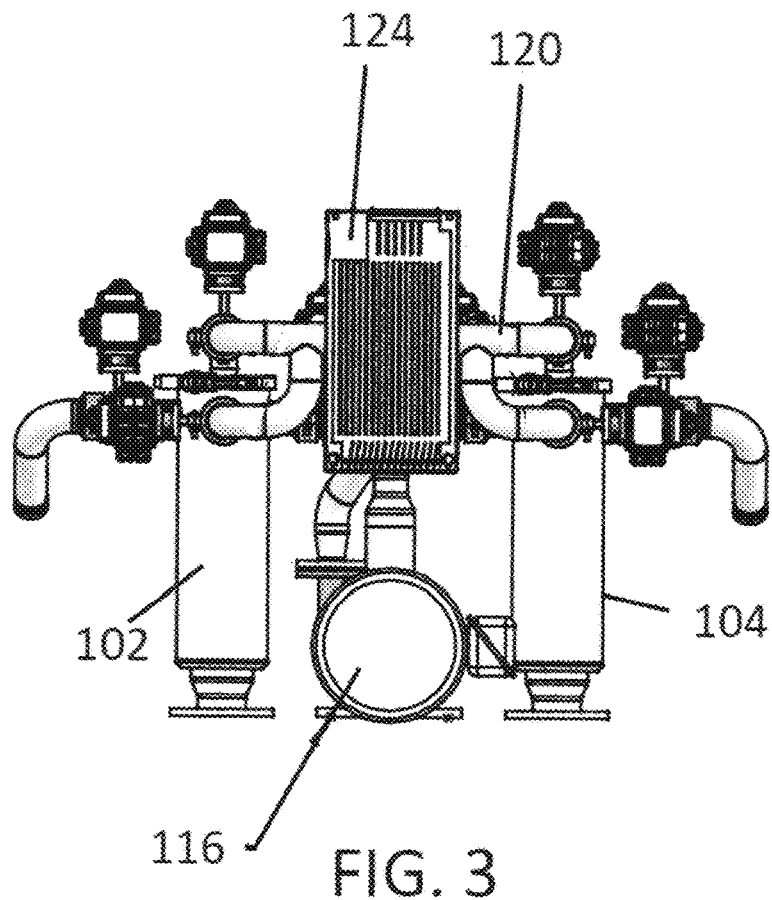
FIG. 3 is a rear view of a sea strainer system in accordance with certain example embodiments.
Figure 4:
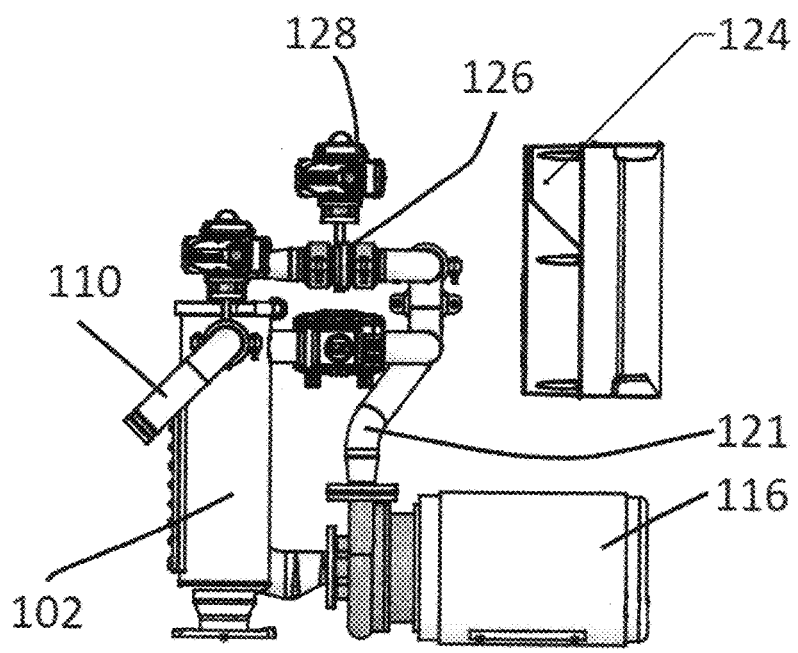
FIG. 4 is a side view of a sea strainer system in accordance with certain example embodiments.
Figure 5:
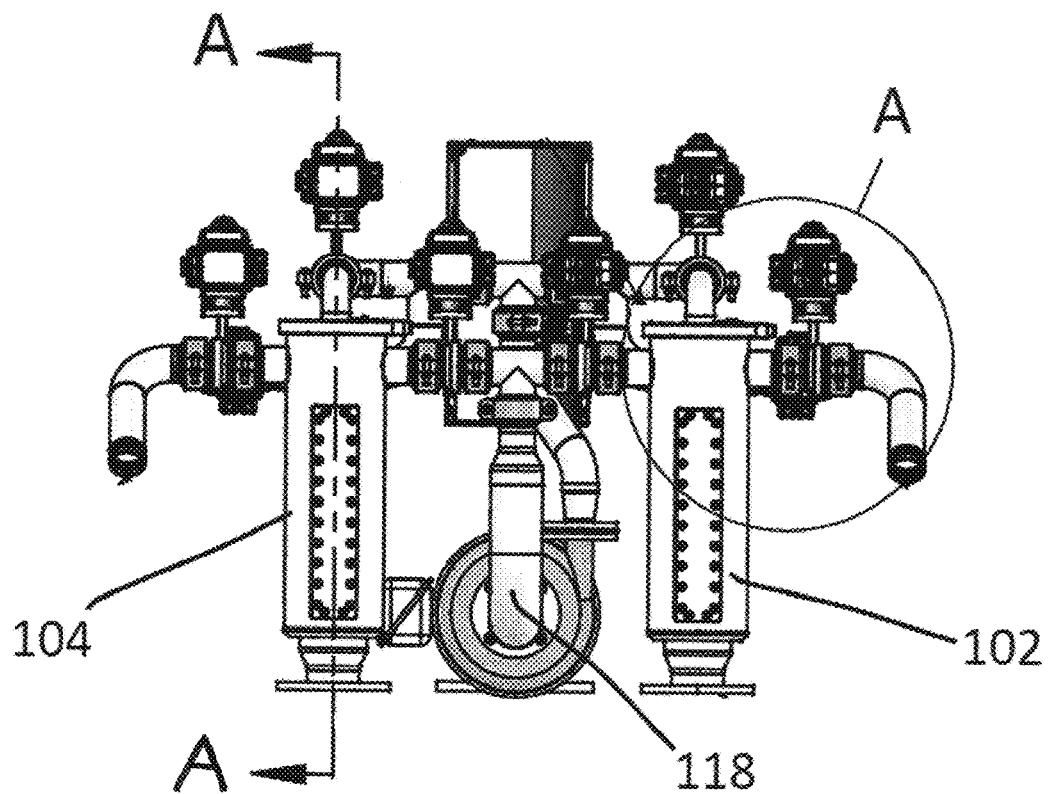
FIG. 5 is a front view of a sea strainer system in accordance with certain example embodiments.
Figure 6:
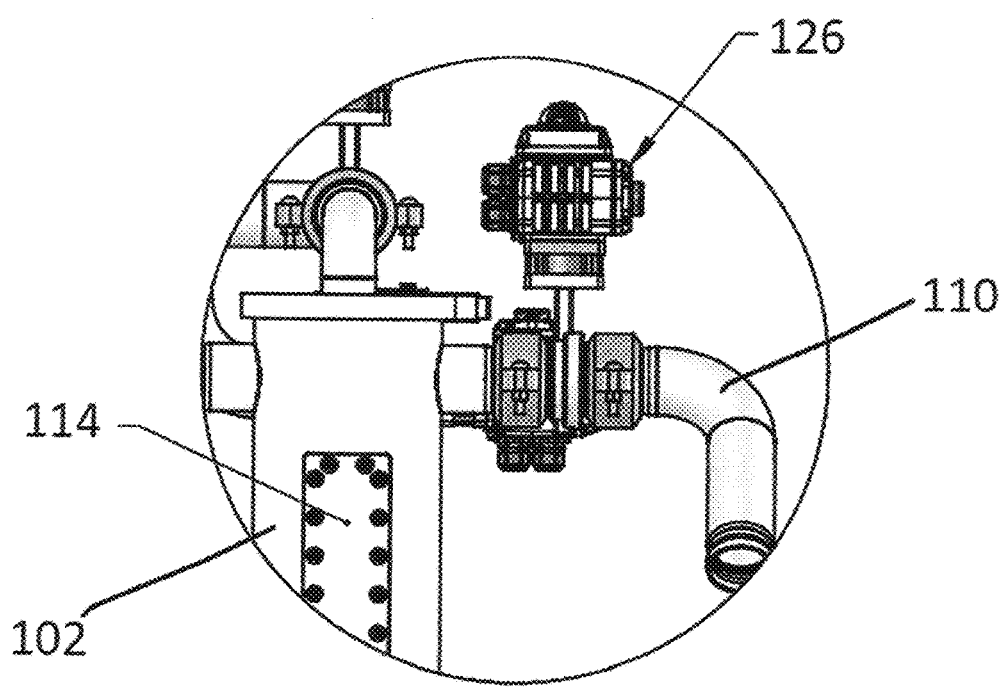
FIG. 6 is a detail view A of the sea strainer system as indicated in FIG. 5 in accordance with certain example embodiments.
Figure 7:
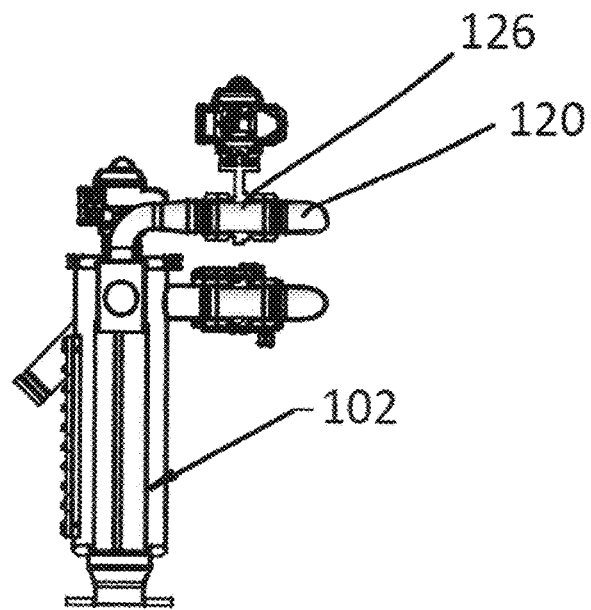
FIG. 7 is a side cross-sectional view along line A-A of FIG. 5 in accordance with certain example embodiments.
Figure 8:
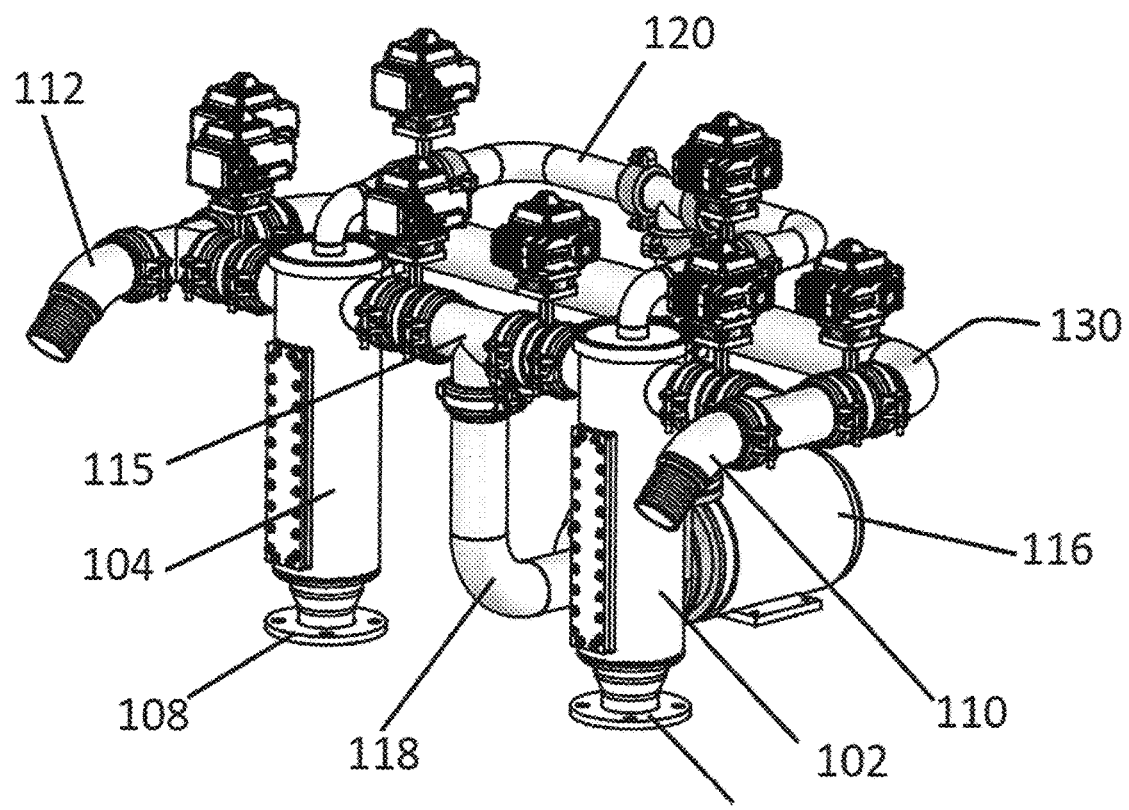
FIG. 8 is a perspective view of a sea strainer system in accordance with certain example embodiments.
Figure 9:
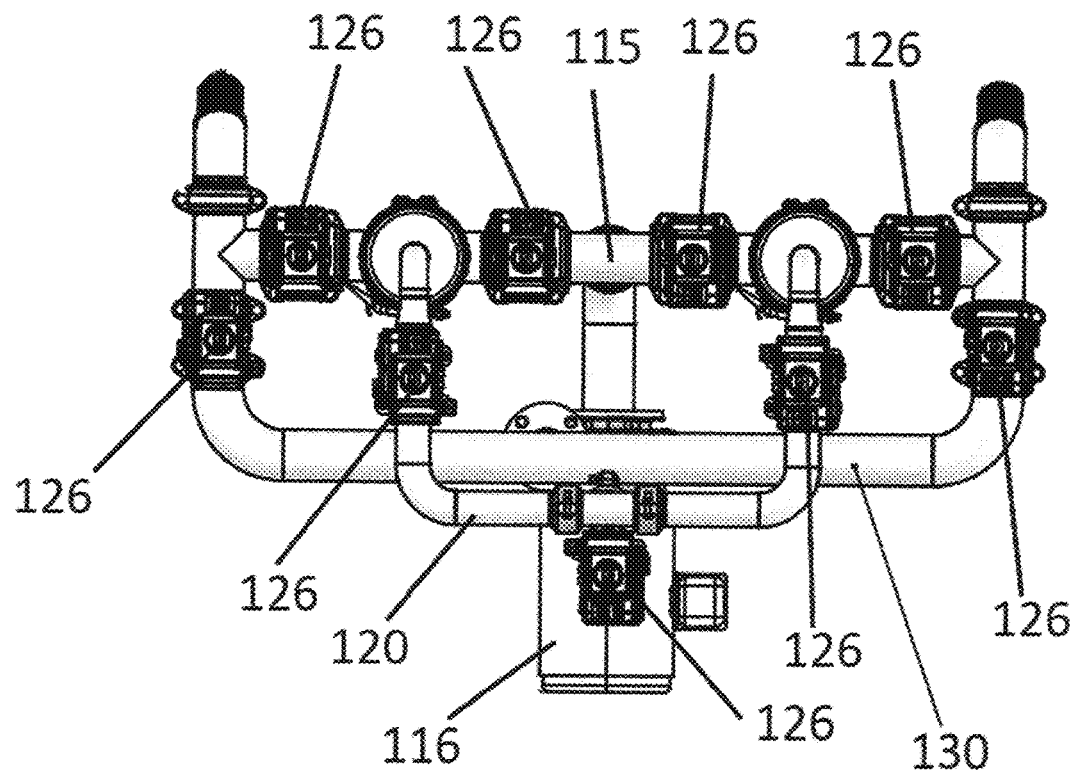
FIG. 9 is a top view of a sea strainer system in accordance with certain example embodiments.
Figure 10:
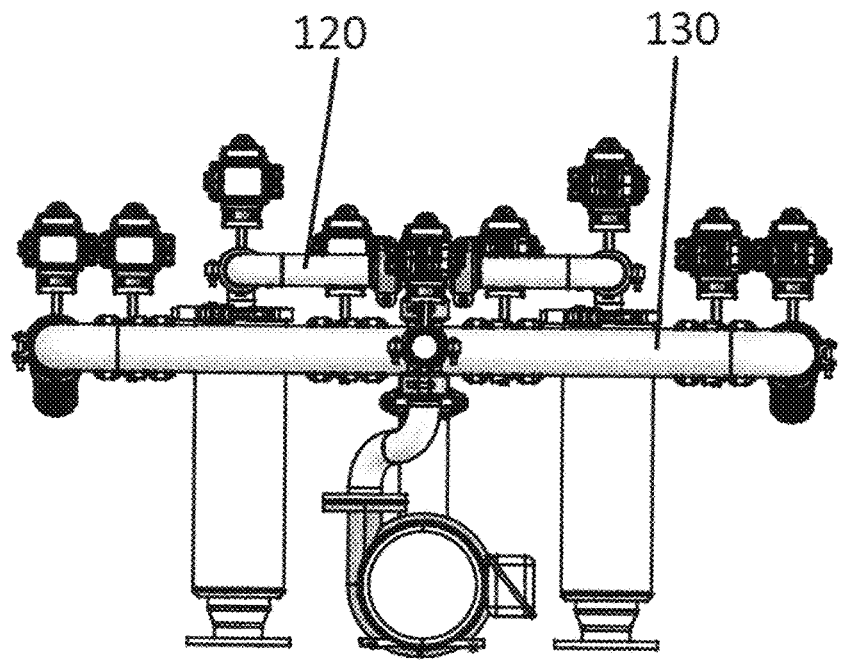
FIG. 10 is a rear view of a sea strainer system in accordance with certain example embodiments.
Figure 11:
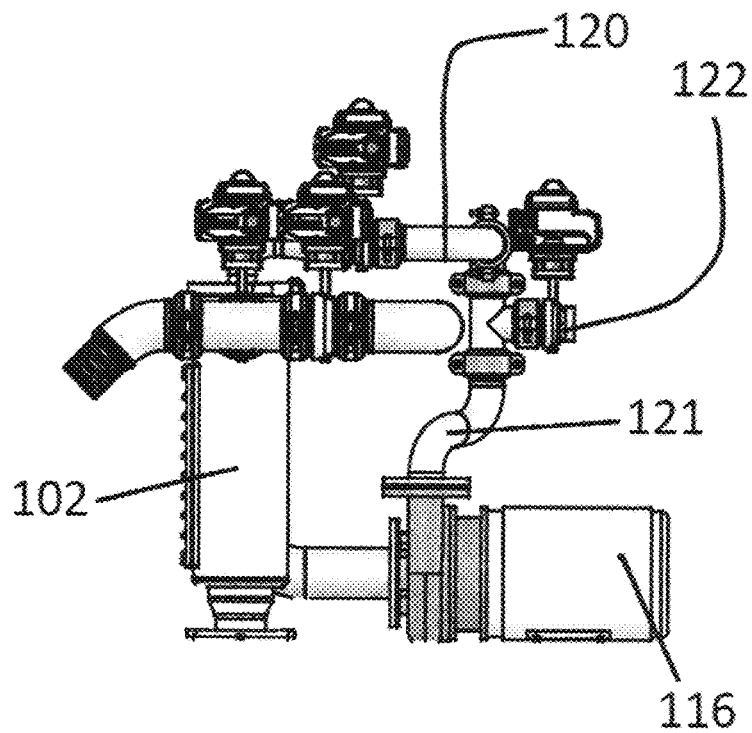
FIG. 11 is a side view of a sea strainer system in accordance with certain example embodiments.
Figure 12:
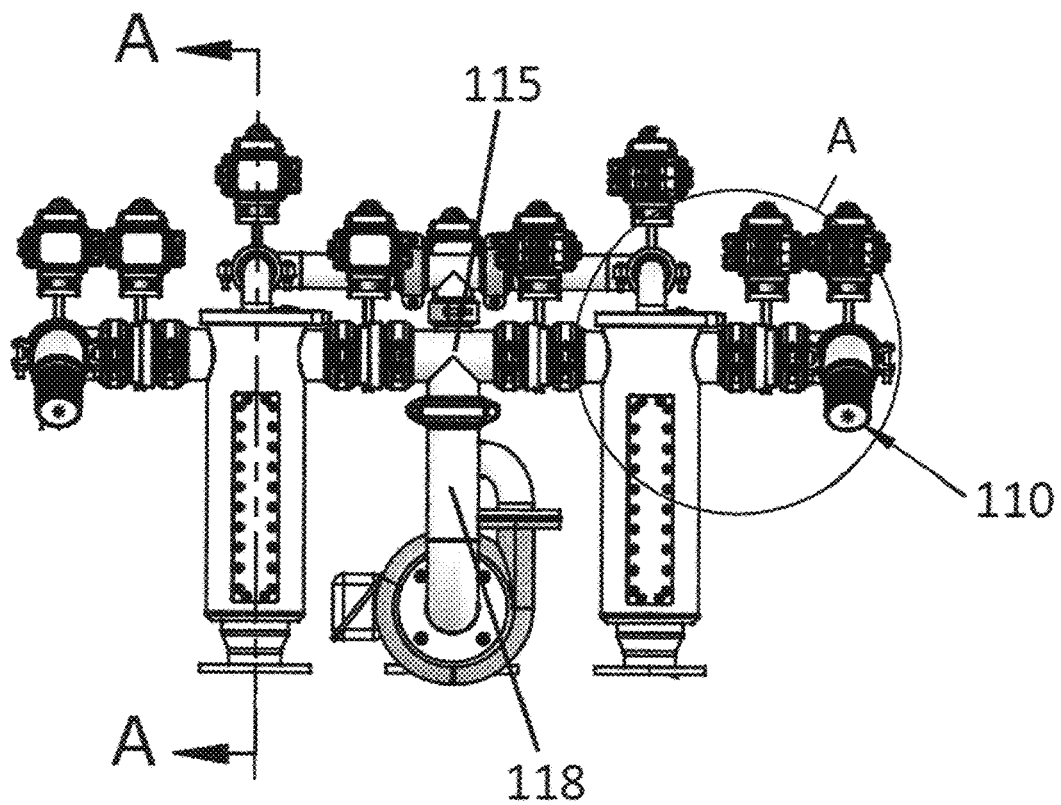
FIG. 12 is a front view of a sea strainer system in accordance with certain example embodiments.
Figure 13:
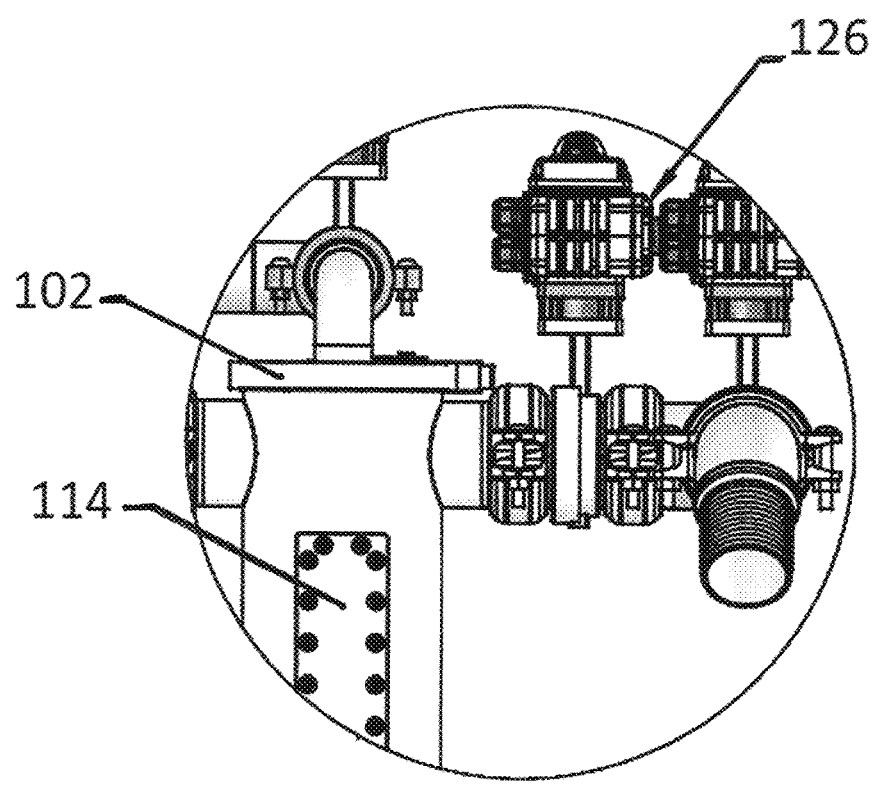
FIG. 13 is a detail view A of the sea strainer system as indicated in FIG. 12 in accordance with certain example embodiments.
Figure 14:
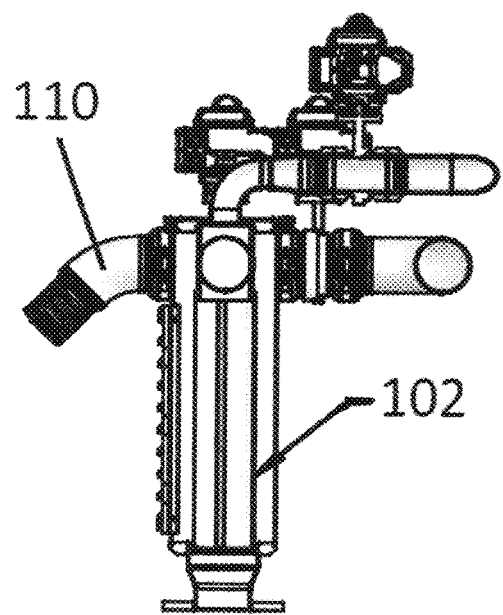
FIG. 14 is a side cross-sectional view along line A-A of FIG. 5 in accordance with certain example embodiments.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various example embodiments; nevertheless, these embodiments are not intended to limit the present invention to any specific example, environment, application, or particular implementation described herein. Therefore, descriptions of these example embodiments are only provided for purpose of illustration rather than to limit the present invention.

It should be recognized that the dimensions and configurations of components depicted in the figures are merely example embodiments. Certain dimensions and proportions can be altered or scaled larger and smaller. The dimensions and shaping can also be altered to be optimized according to the invention to be suitable for particular installations and embodiments unless specific dimensions and/or shapes are specified in a given claim. Thus, the dimensions can be varied without departing from the scope of the invention.

Referring to FIGS. 1-7, a first embodiment of a sea strainer system 100 is shown. The sea strainer system includes a first strainer 102 and a second strainer 104. Sea water is sucked into the inlets 106, 108, respectively, of the first and second strainers 102, 104 and particulates are filtered out inside of the strainers before the sea water is discharged from the strainers 102, 104. Each strainer 102, 104 is coupled to a respective engine outlet conduit 110, 112 for conveying the strained sea water to the cooling system for the vessel's engine or power plant. A window 114 can be provided in a side of each of the strainers 102, 104 so that visual inspections of the inside structure of the strainers can be viewed. The sea strainer system 100 can also be configured with more than two strainers in additional embodiments.

A first cross-flow conduit 115 spans between the strainers 102, 104 to allow strained water from one strainer to flow into the other.

A backflush pump 116 is coupled via a pump conduit 118 to both of the first and second strainers 102, 104. The conduit 118 can be coupled to the first cross-flow conduit 115 between two control valves. The backflush pump 116 forces water backwards through the strainers 102, 104 to eject accumulated particulates in the strainers out of the inlets 106, 108, thereby cleansing the strainers 102, 104. A variable speed frequency drive 124 is coupled to the backflush pump 116 to provide for a variable output capability of the backflush pump.

A second cross-flow conduit 120 also spans between the strainers 102, 104 to allow strained water from one strainer to flow into the other. The backflush pump 116 can also be coupled to the second cross-flow conduit via a second pump conduit 121.

The second cross-flow conduit 120 can also be used to connect to a firefighting system onboard the vessel. As will be explained below, a fire pump can be coupled to the second cross-flow conduit 120 so that the combined outputs of the strainers 102, 104 and pump 116 can feed raw and/or strained water to a fire pump that provides water to the firefighting system onboard the vessel.

The sea strainer system includes a plurality of valves 126 as can be seen in the figures. Each valve 126 includes a valve actuator 128 that is coupled to a control system for controlling the opening and closing of the valves 126. The valves 126 are disposed throughout the sea strainer system 100, including on the connecting conduits, as indicated, so that the various components of the sea strainer system 100 can be isolated for operating the system according to various modes as will be described herein and indicated in the figures.

Referring now to FIGS. 8-14, the sea strainer system 100 illustrates the fire pump outlet 122 disposed on the second cross-flow conduit 120. In addition, the engine outlet conduits 110, 112 are connected to one another by a crossover conduit 130. This crossover conduit 130 allows both outlets 110, 112 to be supplied water by a single one of the strainers 102, 104 while the other strainer is isolated from the engine supply by actuation of the appropriate valves 126. This isolation allows the isolated strainer to be back flushed without shutting down the vessel's engine operation.

Referring to FIGS. 15-19, various operating conditions of the sea strainer system 100 are illustrated. The open or closed state of each valve 126 is indicated by a "C" for closed and an "O" for open. Each valve 126 is also labeled with a numeral corresponding to the valve sequence indicated in FIG. 21. The flow of sea water is indicated by arrows for clarity.

Figure 15:
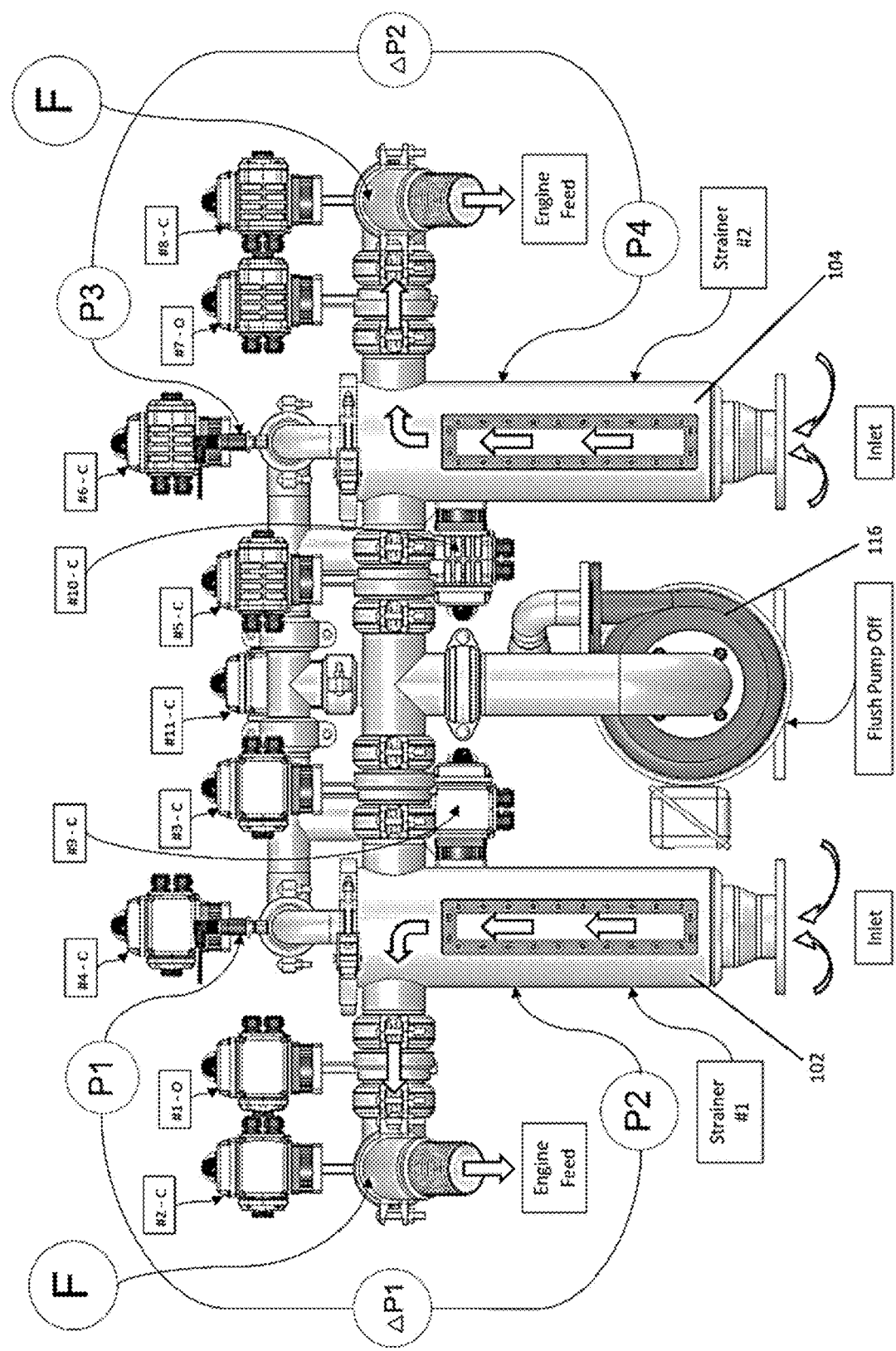
FIG. 15 is a front view of a sea strainer showing an operating state for the sea strainer system in accordance with certain example embodiments.

Referring specifically to FIG. 15, strained sea water is being supplied to the vessel's engine. Raw sea water is taken in at the inlets 106, 108, strained through each of the strainers 102, 104 and output to the engine via the engine outlets 110, 112. The flush pump 116 and crossflow conduits 115, 120 are isolated. The flush pump 116 is in the off state.

Figure 16:
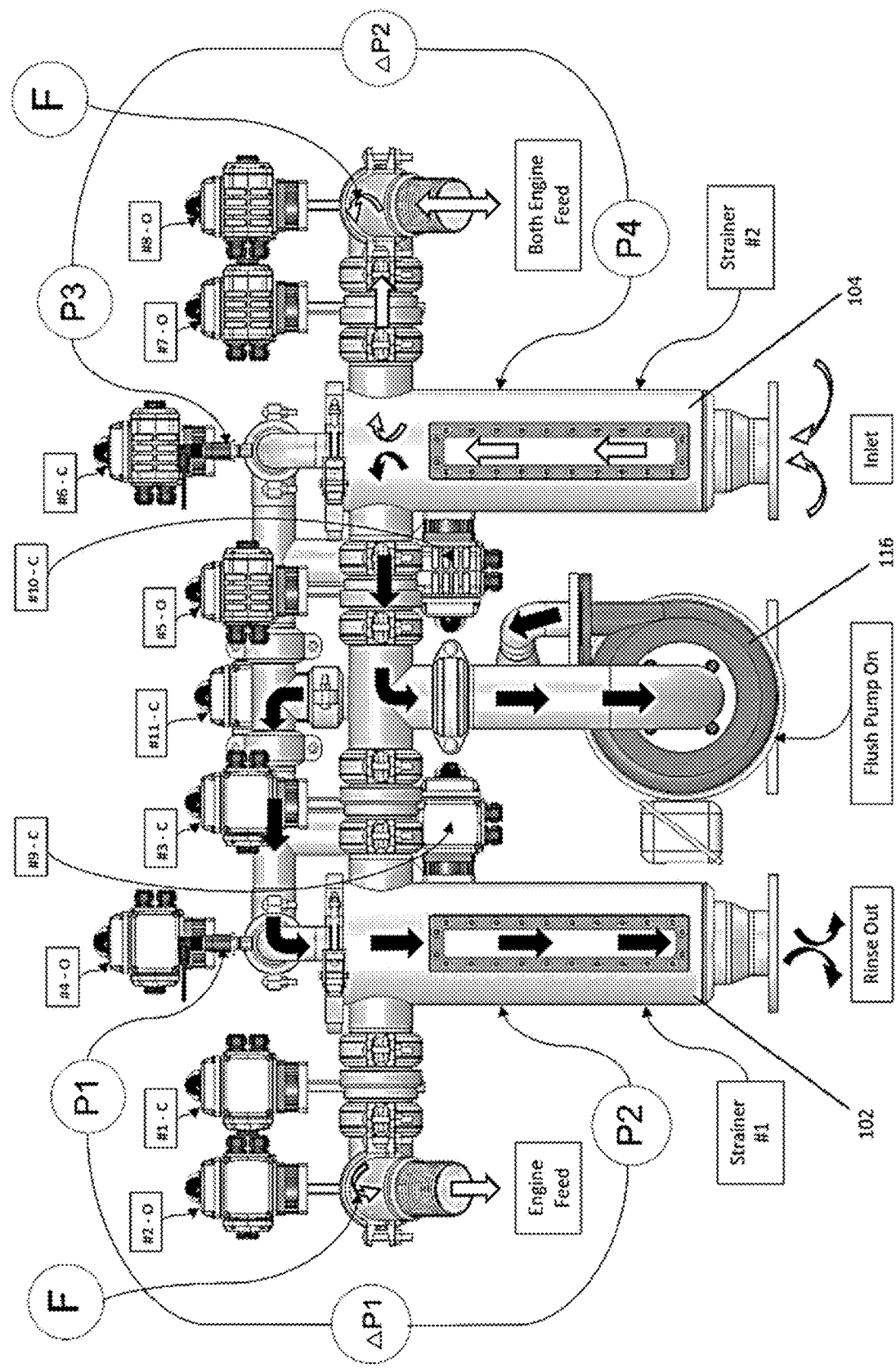
FIG. 16 is a front view of a sea strainer showing an operating state for the sea strainer system in accordance with certain example embodiments.

Referring specifically to FIG. 16, the first strainer 102 is being back flushed while the second strainer 104 is supplying strained seawater to both engine outlets 110, 112. The flush pump 116 takes in water from the second strainer 104 via the first cross-flow conduit 115 and then pumps that water out through the second cross-flow conduit 120 and into the first strainer 102 to perform the back flushing. Water from the second strainer also feeds the engine outlet(s) 110 and/or 112.

Figure 17:
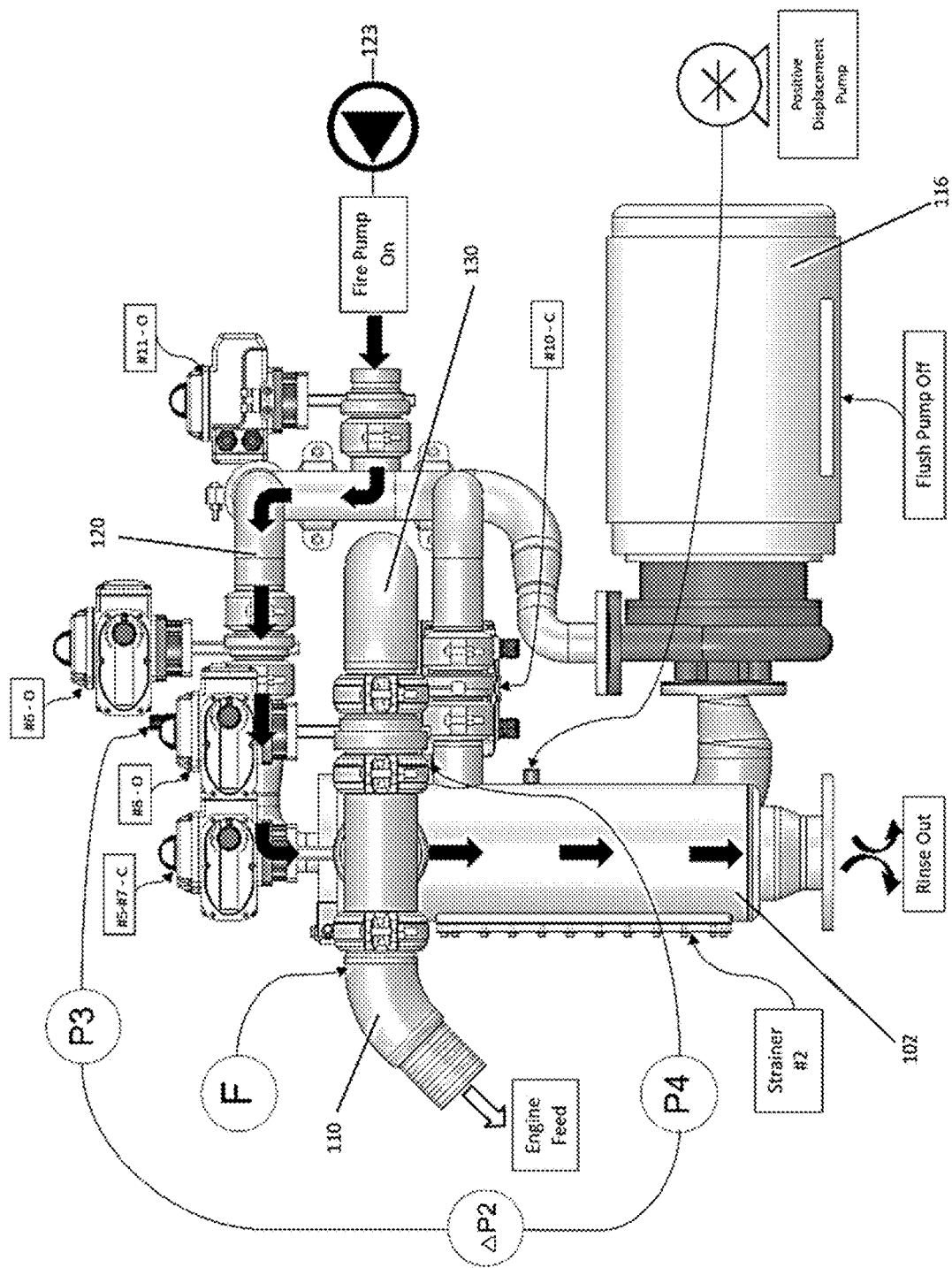
FIG. 17 is a side view of a sea strainer showing an operating state for the sea strainer system in accordance with certain example embodiments.

Referring specifically to FIG. 17, the fire pump 123 that is coupled to the fire pump outlet 122 is being used to feed water through the second cross-flow conduit 120 to flush out or rinse one or both of the strainers 102, 104, depending on the valve 126 configurations. The valves 126 are actuated to isolate the strainer or strainers to be flushed. The fire pump 123 is turned on and water from the fire system is flushed backwards through the second cross-flow conduit 120 and out of the strainer(s) 102, 104. The flush pump 116 is off and the engine outlets 110, 112 are isolated.

Figure 18:
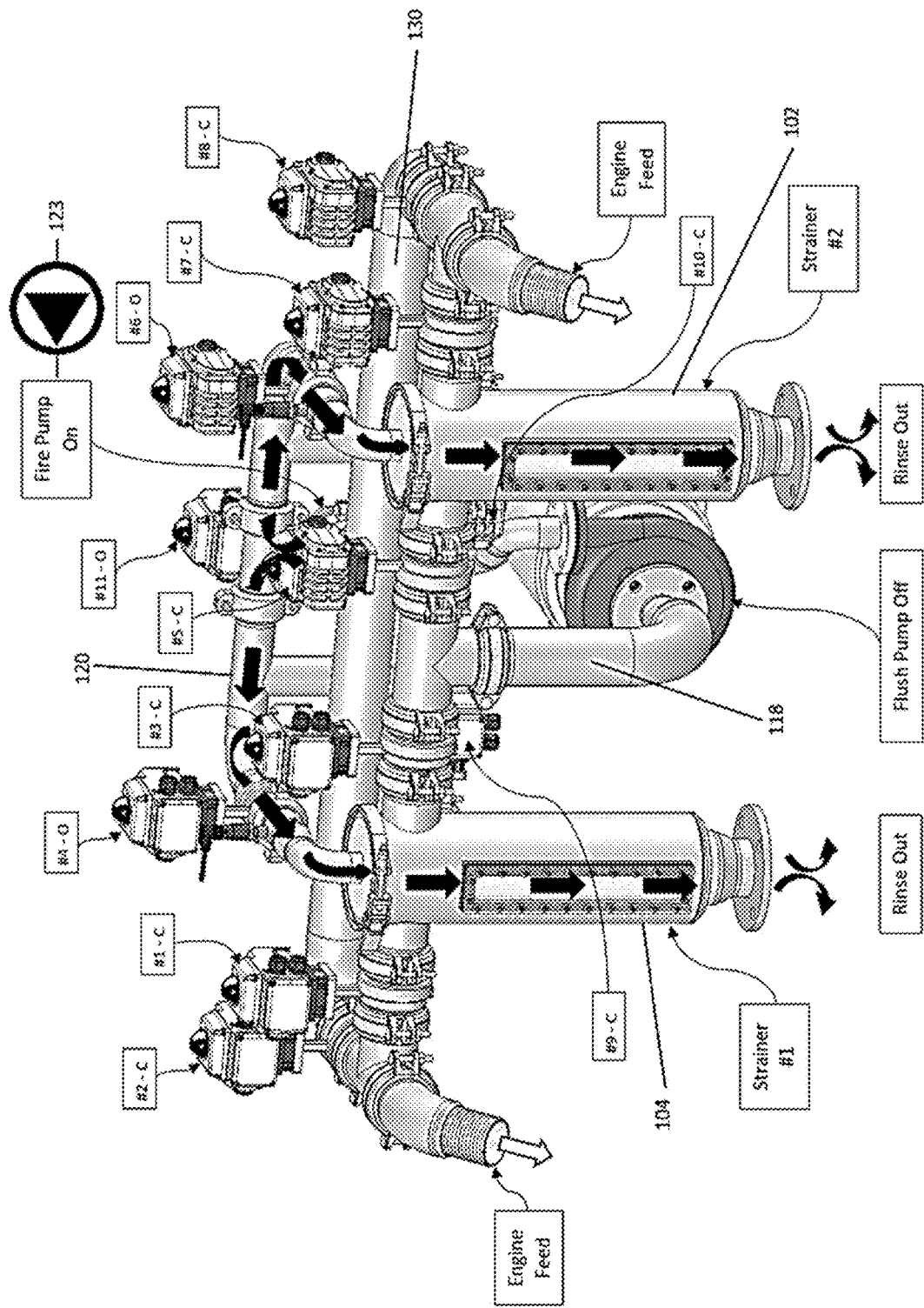
FIG. 18 is an isometric view of a sea strainer showing an operating state for the sea strainer system in accordance with certain example embodiments.

Referring specifically to FIG. 18, the fire pump 123 is being used to flush both strainers 102, 104. The flush pump 116 is off and isolated. The engine feeds 110, 112 are also isolated.

Figure 19:
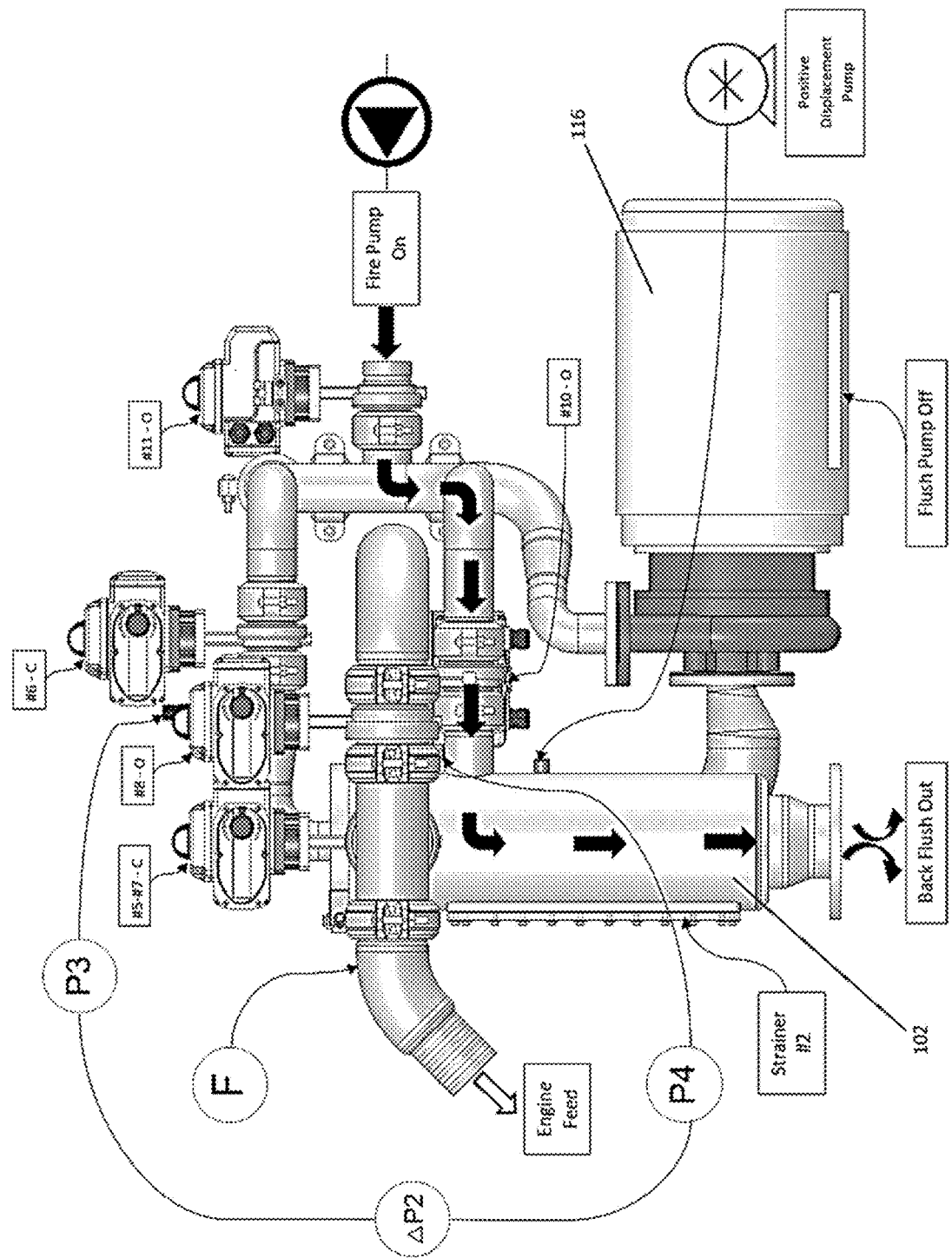
FIG. 19 is a side view of a sea strainer showing an operating state for the sea strainer system in accordance with certain example embodiments.

Referring specifically to FIG. 19, the second strainer 104 is being back flushed via the fire pump 123 while the first strainer 102 is supplying strained seawater to both engine outlets 110, 112. The flush pump 116 is off.

Figure 20:
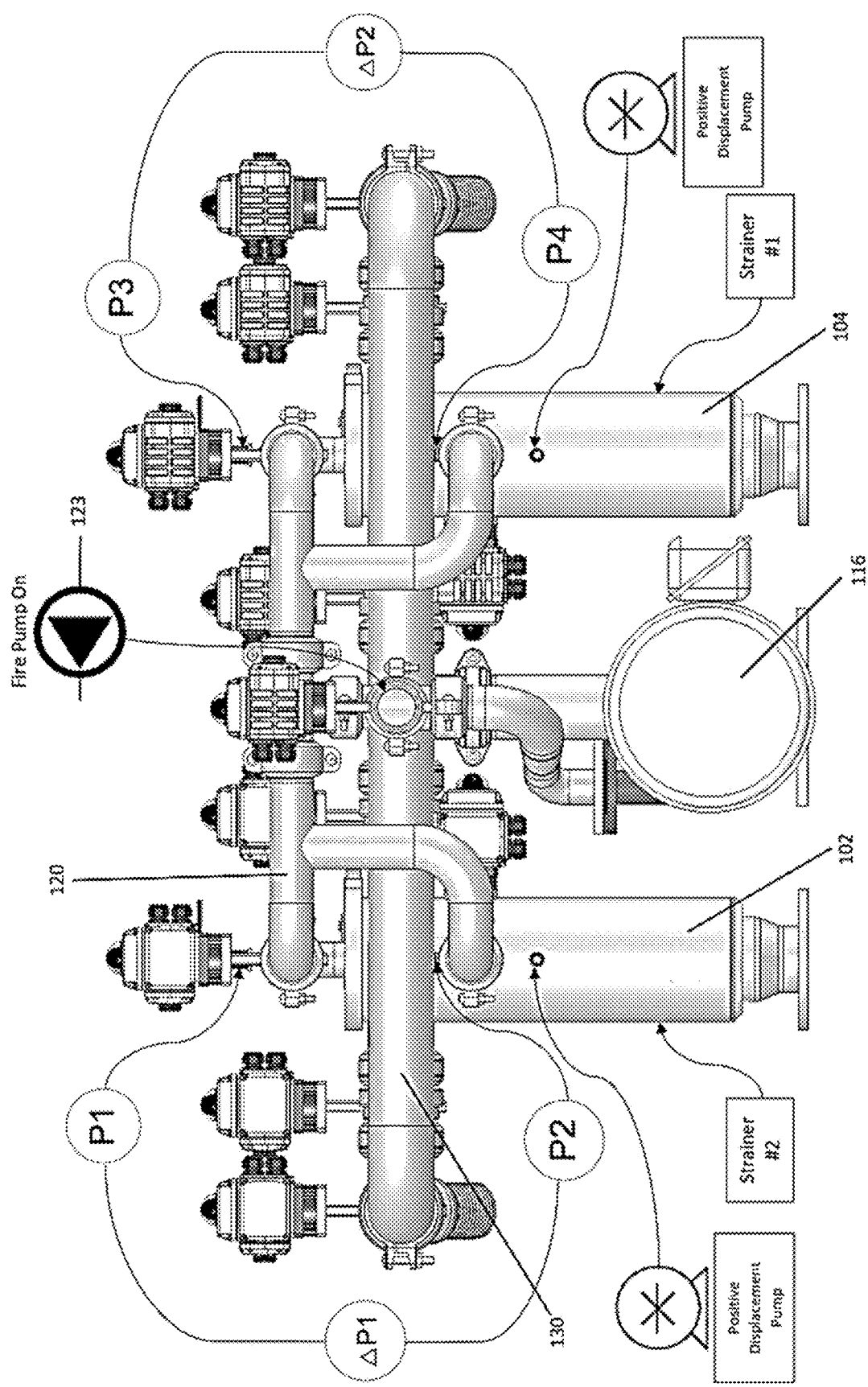
FIG. 20 is a rear view of a sea strainer showing an operating state for the sea strainer system in accordance with certain example embodiments.

FIG. 20 provides a rear view of the sea strainer system 100 discussed in FIGS. 15-19.

FIG. 21 is a table showing the valve 126 states (open or closed) for several different operating states of the sea strainer system 100, including those specifically discussed with respect to FIGS. 15-19. Open valves 126 are indicated as such in the corresponding block and closed valves 126 are indicated by grayed-out blocks.

Two of the indicated operating states in FIG. 21 are strainer screen element bypass states (bottom two rows of FIG. 21). In these states, the sea water is not filtered through the strainer screen before passing through the strainer system and traveling to the intended destination.

Figure 22:
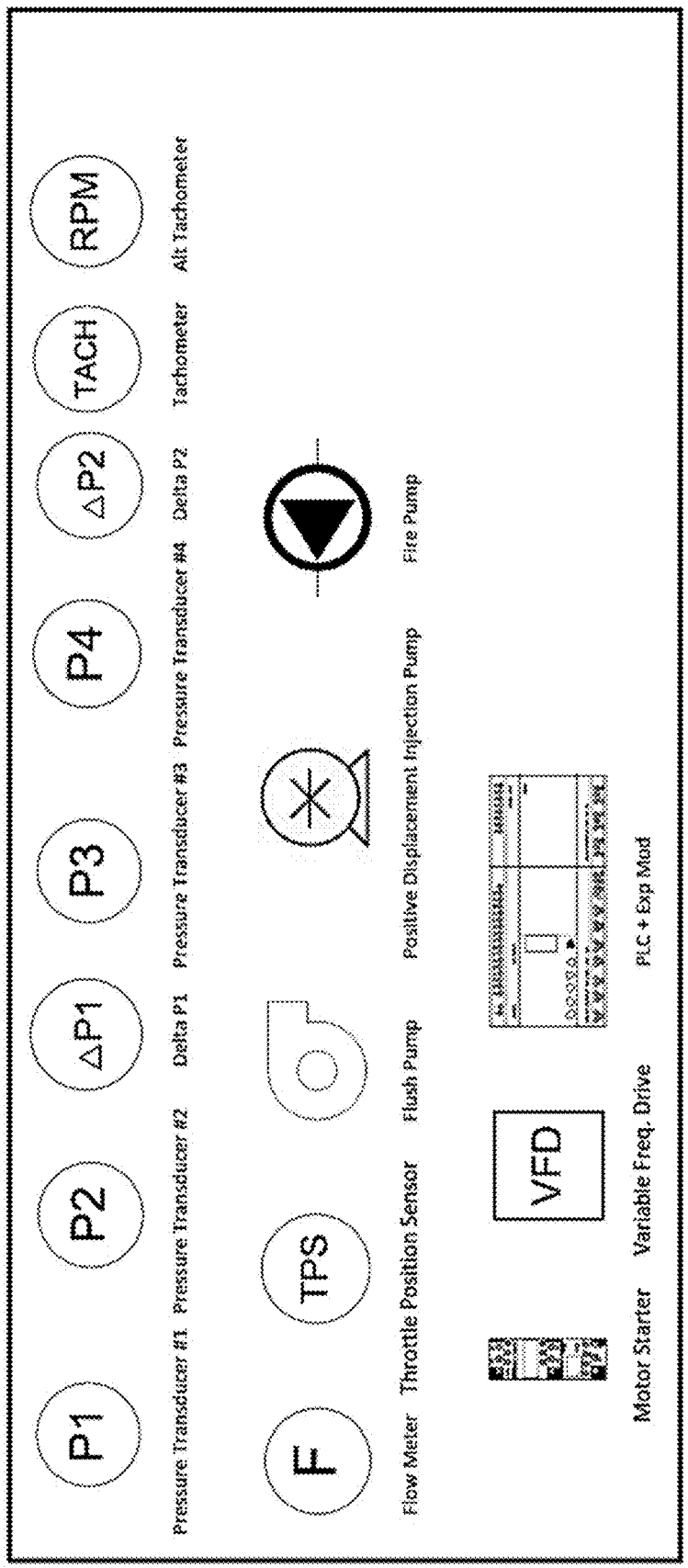
FIG. 22 is a component legend for FIGS. 15-20 and 23.

FIG. 22 is a legend of the symbols used in FIGS. 15-20 and 23.

Figure 23:
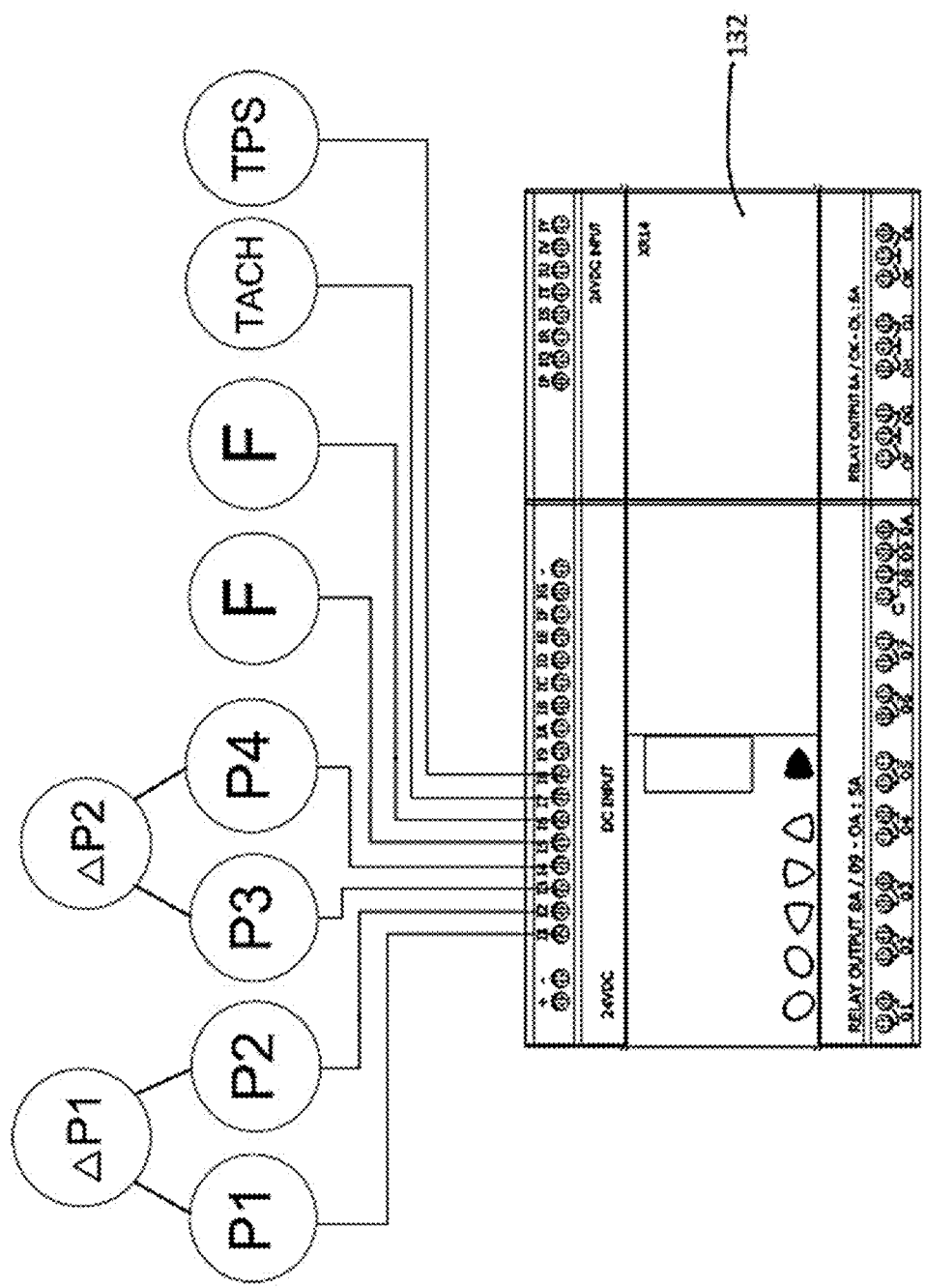
FIG. 23 is a PLC control diagram for the sea strainer system in accordance with certain example embodiments.
Figure 24:
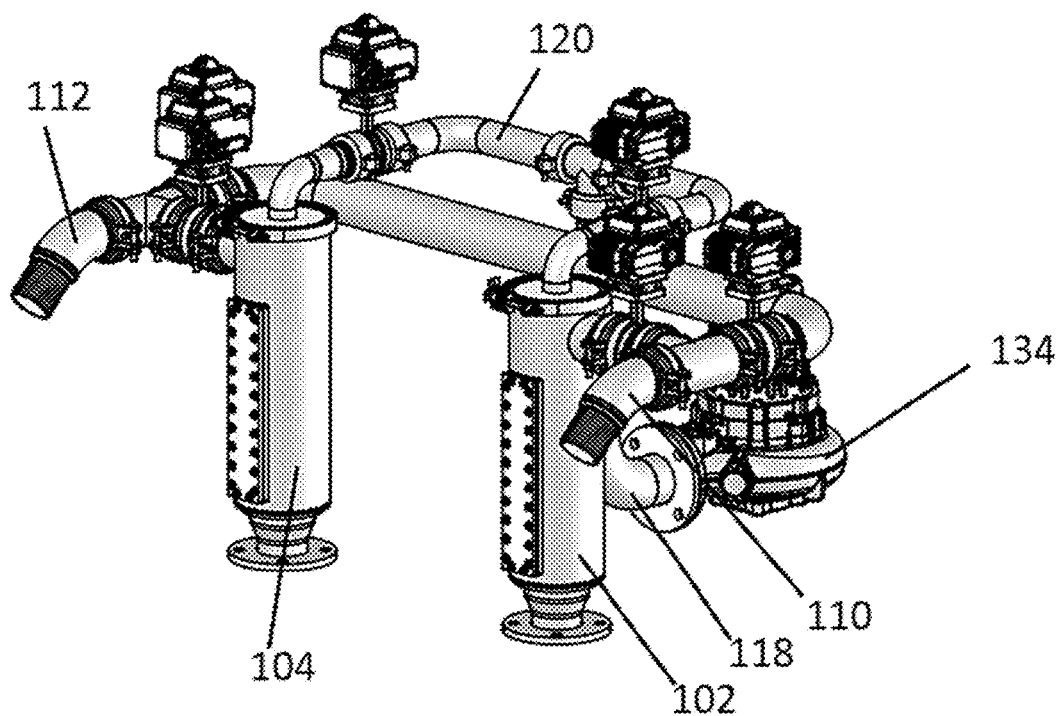
FIG. 24 is a perspective view of a sea strainer system in accordance with certain example embodiments.
Figure 25:
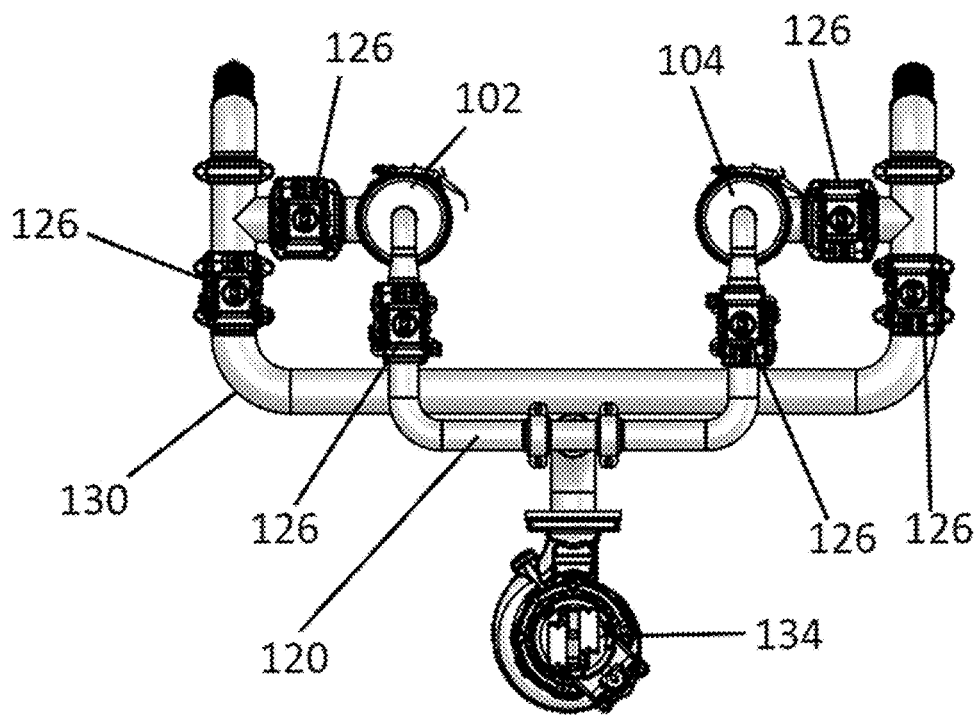
FIG. 25 is a top view of a sea strainer system in accordance with certain example embodiments.
Figure 26:
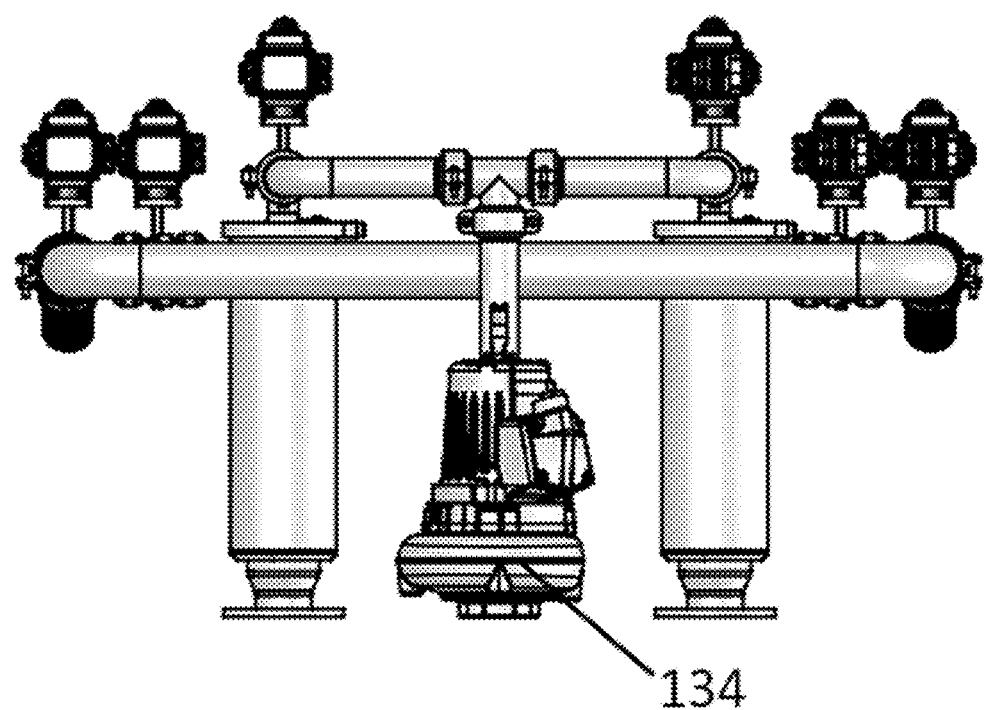
FIG. 26 is a rear view of a sea strainer system in accordance with certain example embodiments.
Figure 27:
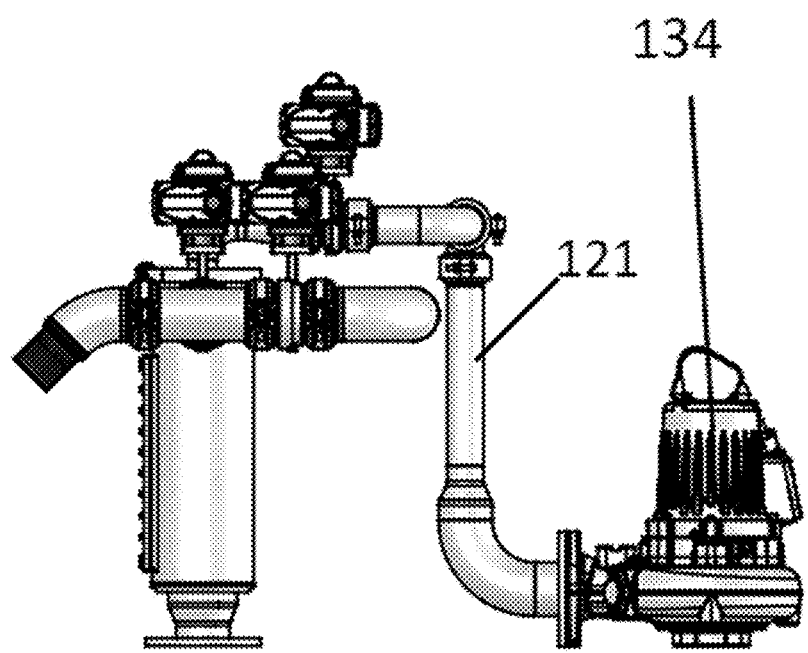
FIG. 27 is a side view of a sea strainer system in accordance with certain example embodiments.
Figure 28:
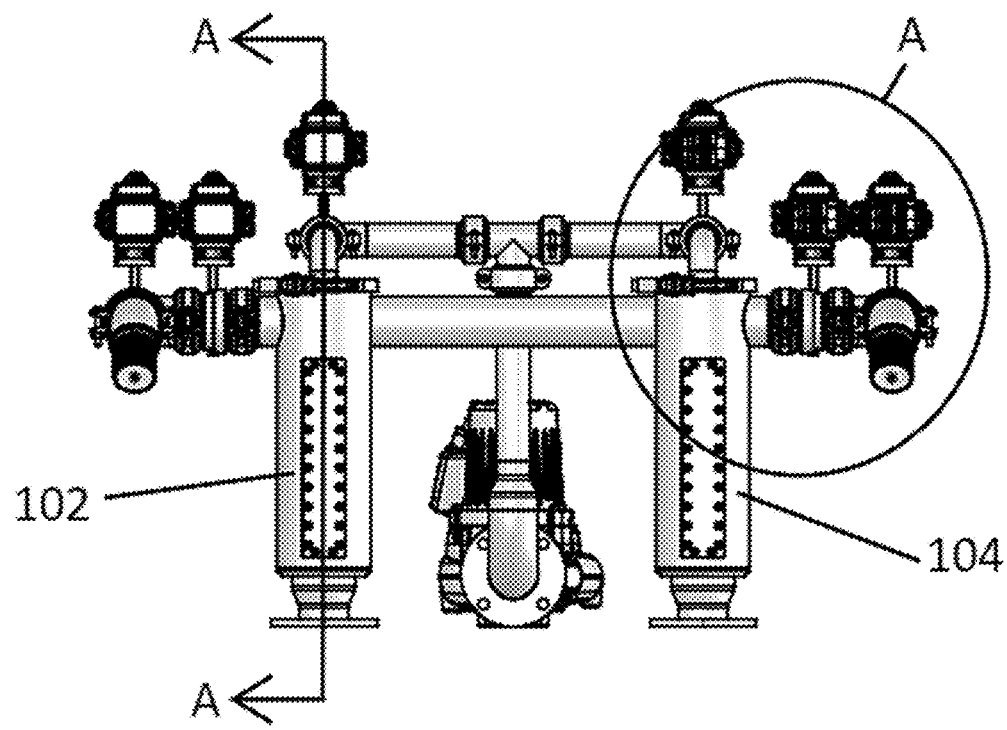
FIG. 28 is a front view of a sea strainer system in accordance with certain example embodiments.
Figure 29:
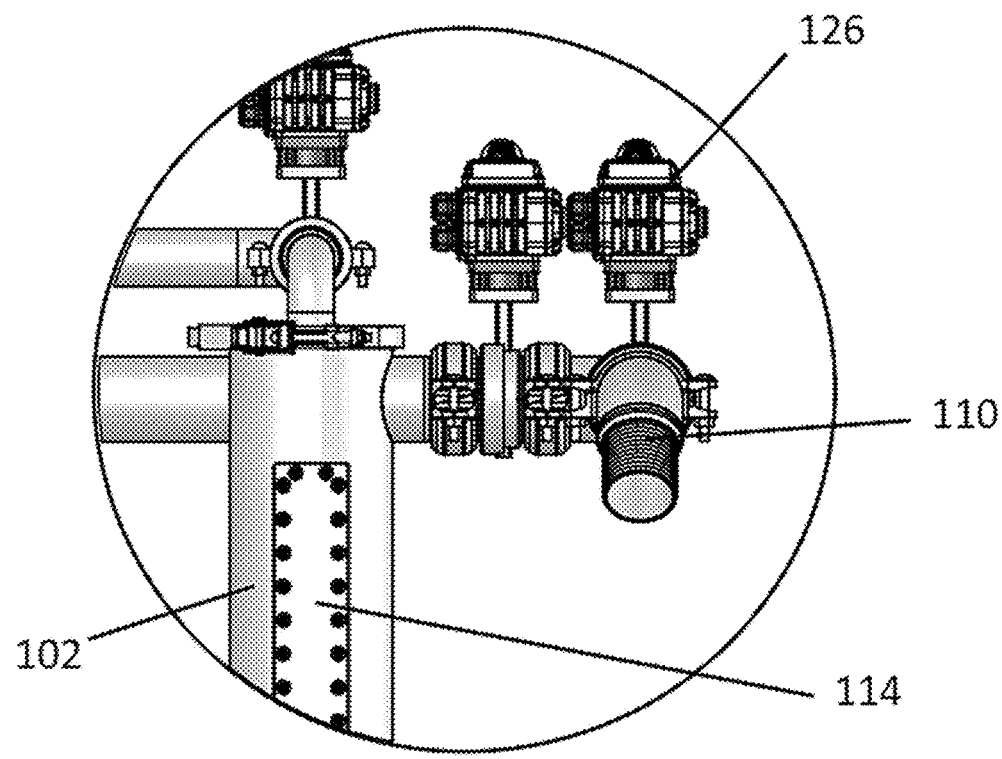
FIG. 29 is a detail view A of the sea strainer system as indicated in FIG. 28 in accordance with certain example embodiments.
Figure 30:
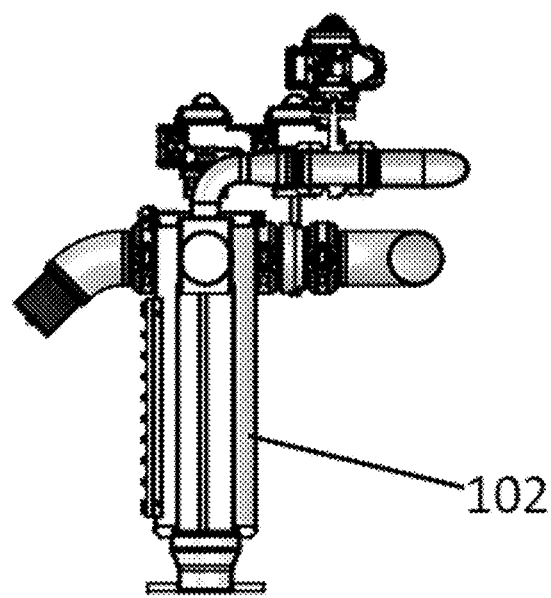
FIG. 30 is a side cross-sectional view along line A-A of FIG. 28 in accordance with certain example embodiments.
Figure 31:
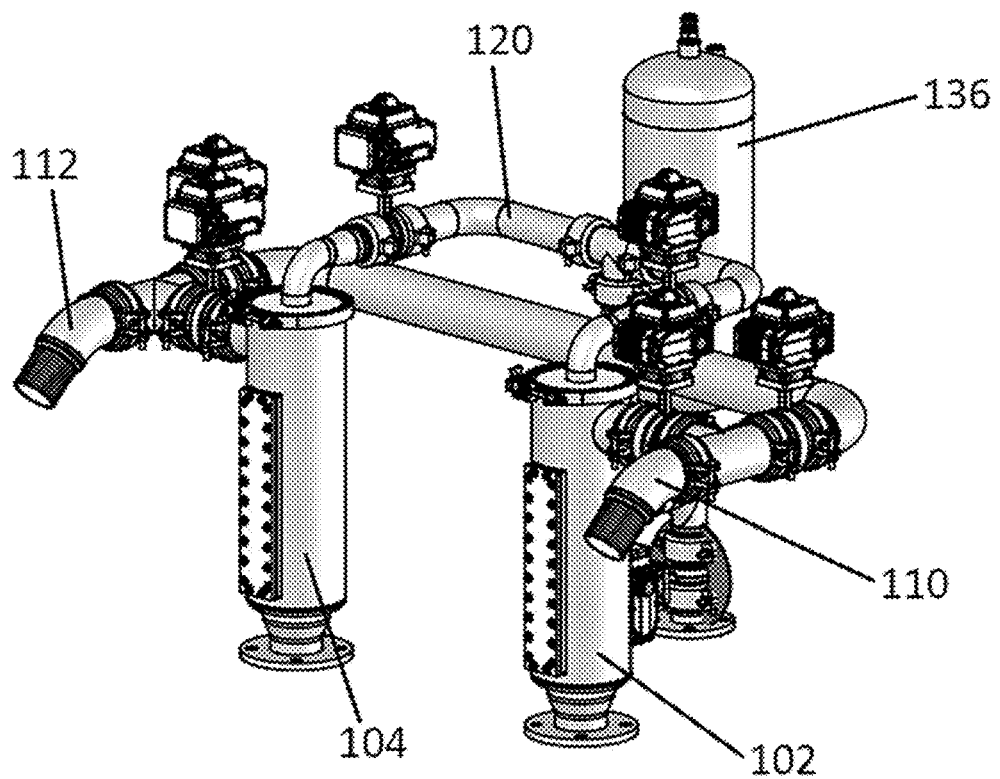
FIG. 31 is a perspective view of a sea strainer system in accordance with certain example embodiments.
Figure 32:
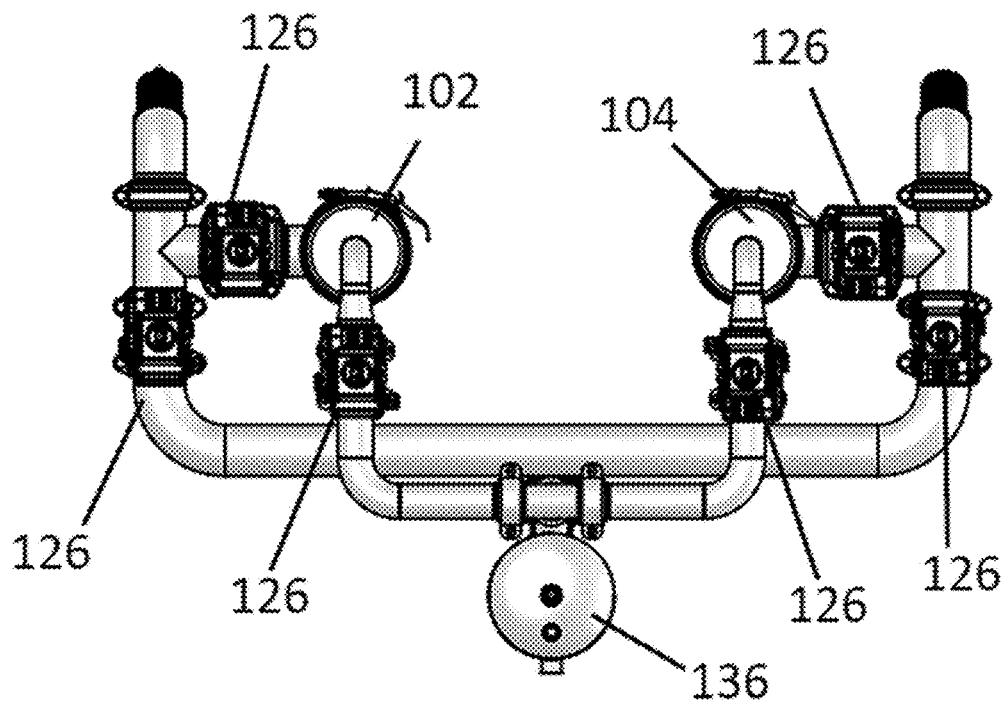
FIG. 32 is a top view of a sea strainer system in accordance with certain example embodiments.
Figure 33:
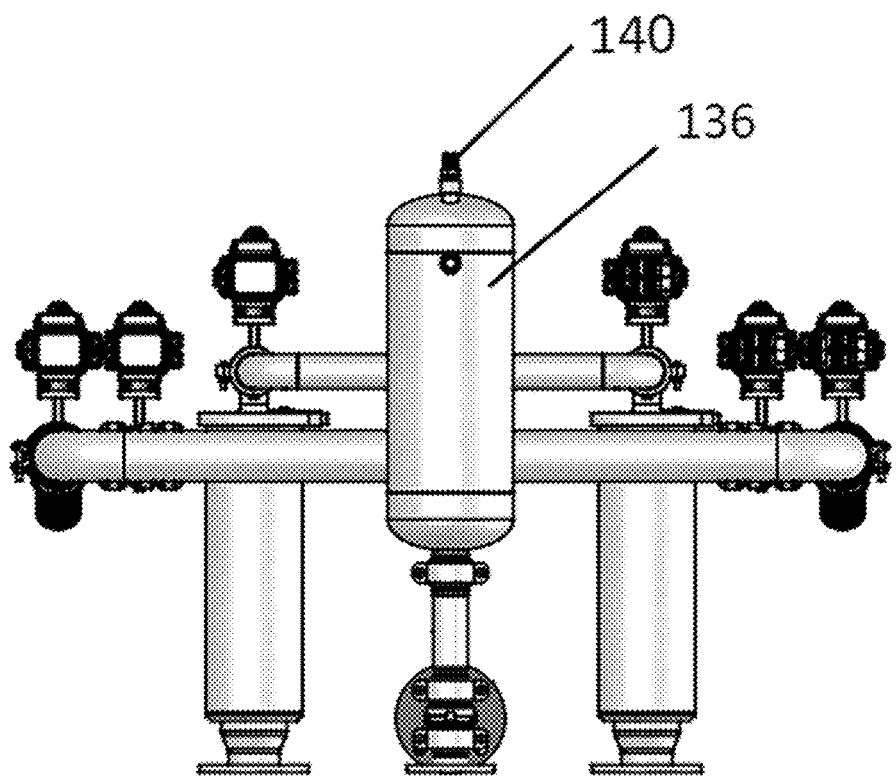
FIG. 33 is a rear view of a sea strainer system in accordance with certain example embodiments.
Figure 34:
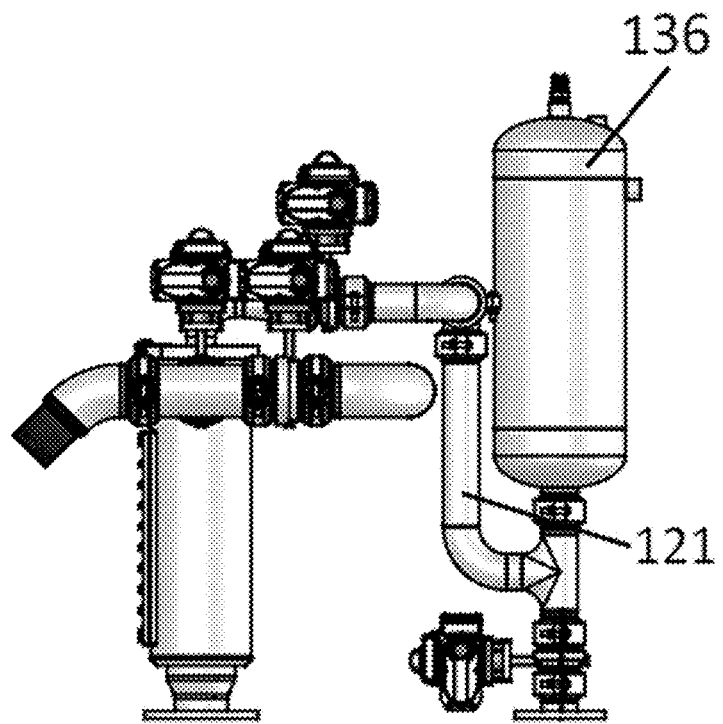
FIG. 34 is a side view of a sea strainer system in accordance with certain example embodiments.
Figure 35:
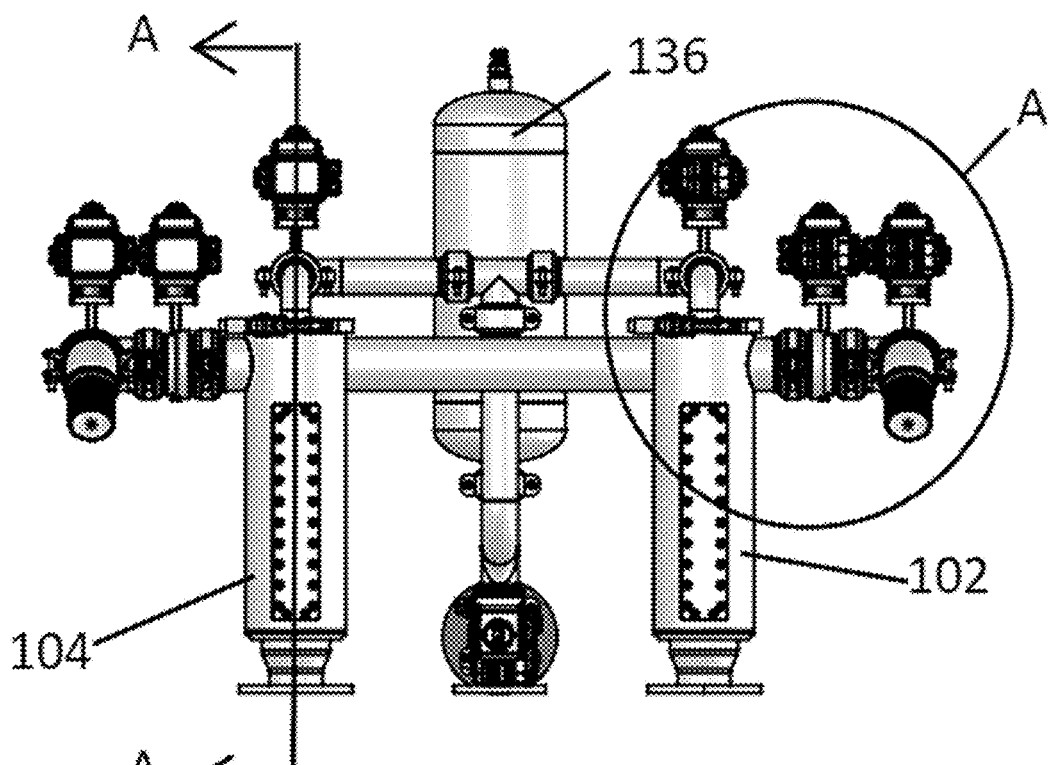
FIG. 35 is a front view of a sea strainer system in accordance with certain example embodiments.
Figure 36:
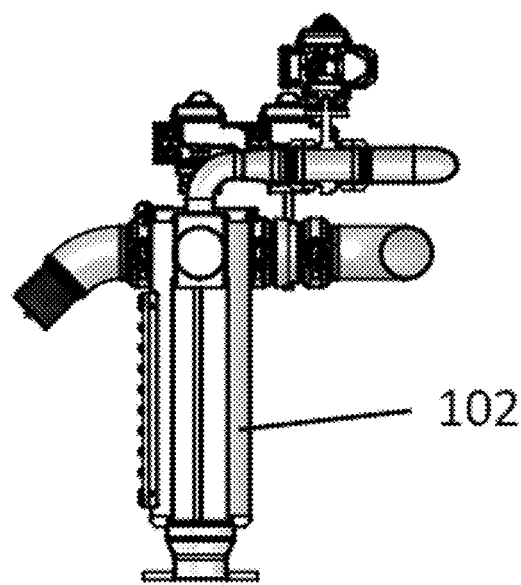
FIG. 36 is a detail view A of the sea strainer system as indicated in FIG. 35 in accordance with certain example embodiments.
Figure 37:
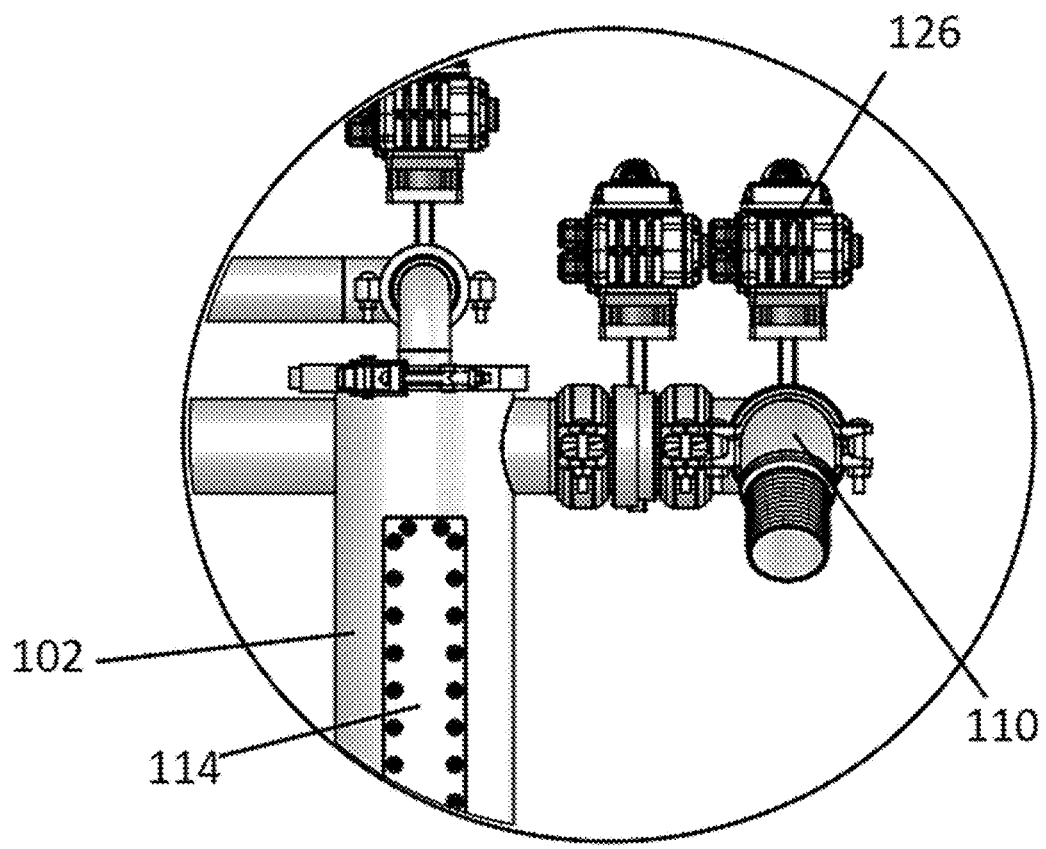
FIG. 37 is a side cross-sectional view along line A-A of FIG. 35 in accordance with certain example embodiments.

FIG. 23 shows a programmable logic controller (PLC) diagram for the programmable controller 132 of the sea strainer system 100. As indicated, several sensors, such as pressure sensors (pressure transducers), flow meters, throttle position sensors, tachometers, timers, etc. can be used to provide input data to the controller 132 so that the software residing in memory of the controller can optimize the operation of the system. For example, the various valves 126 can be opened or closed as necessary, and the outputs of the flush pump 116 and fire pump 123 can be adjusted depending on the outputs of one or more of the sensors noted above. The controller 132 is communicatively coupled to each of these analog and/or digital sensor components for collecting input data regarding operation of the vessel and then automatically controlling the operation of the sea strainer system 100.

Referring to FIGS. 24-30, the flush pump 116 of the previous embodiments is replaced by a trash pump 134. The trash pump allows the strainers 102, 104 to be flushed with raw sea water. In contrast, the flush pump in the previous embodiments sourced the flush water from an outlet of one of the strainers (or a conduit connected thereto) so that the other strainer could be flushed out. In the embodiment of FIGS. 24-30, the first cross-flow conduit 115 is not necessary because the trash pump 134 does not need to source the flush water from the strainer. The trash pump pulls in raw sea water to perform the flushing.

Under normal operation, the flush valves 126a, 126b are closed and seawater is drawn through the strainers 102, 104 and outbound to the engine cooling system via the outlets 110, 112. When a flushing operation is initiated on one of the strainers (e.g., 102), the corresponding valve 126c going to the engine cooling system is closed, and the flush valve 126c between the strainer 102 being flushed and the trash pump 134 is opened. The trash pump 134 is then started, thereby forcing pressurized water through the central section of the strainer 102 to clean any debris from the strainer's wall. The flush water is ejected from the strainer 102 in reverse from the suction inlet 106 at the bottom of the strainer 102. Of course, both strainers could be flushed simultaneously in this embodiment by actuating the control valves 126 to allow flow from the trash pump 134 through both strainers 102, 104 and blocking flow to both engine outlets 110, 112.

Referring to FIGS. 31-37, the flush pump 116 of the previous embodiment is replaced by a flush tank 136 to provide for flushing using sea raw water. The tank 136 provides a reservoir of raw sea water to be used for a flushing operation.

The raw water flush tank 136 is initially primed by opening the bottom valve 138 below the tank 136, which creates a vacuum inside of the tank 136 via a compressed air-powered venturi vacuum generator (not shown) disposed atop the tank 136. Once the water level inside of the tank 136 has reached a desired point (i.e. a desired volume of sea water is in the tank), a float switch (or other level monitoring device) in the tank 136 sends a signal to the controller to close the bottom valve 138 and close the solenoid valve 140 to the vacuum generator.

Under normal operation, the flush valves 126a, 126b are closed and seawater is drawn through the strainers 102, 104 and outbound to the engine cooling system via the outlets 110, 112. When a flushing operation is initiated on one of the strainers (e.g. 102), the corresponding valve 126c going to the engine cooling system is closed, and the valve 126c between the strainer 102 and the tank 136 is opened. Then a solenoid valve 140 on top of the tank 136 is opened to allow compressed air to pressurize the top of the tank 136, thereby forcing the volume of raw sea water out of the tank 136 and through the central section of the strainer 102 to clean any debris from the strainer's wall. The flush water is ejected from the strainer 102 in reverse from the suction inlet 106 at the bottom of the strainer 102. Once complete, the strainer 102 returns to normal operation and the flush tank 136 is re-primed through the same operation described previously. Of course, both strainers could be flushed simultaneously in this embodiment by actuating the control valves 126 to allow flow from the tank 136 through both strainers 102, 104 and blocking flow to both engine outlets 110, 112.

In certain embodiments, candle-type elements can be provided, which can be back flushed by isolating individual strainers within a common housing by reversing flow sequentially in a radial fashion. In other alternatives, suction scanners can be used to vacuum contaminates from the screen of the strainers.

In further embodiments, a soaking solution can be injected into the backflow fluid stream in order to enhance removal of accumulated marine growth. A tank to hold the solution and an injector can be provided to the sea strainer system to inject the desired amount of solution as controlled by the PLC.

Various components of the sea strainer system can formed of a variety of materials, including stainless steel, copper-nickel, AL6XN, zeron 100, duplex or super-duplex alloys, titanium, plastics, or any other material suitable for corrosion resistance in many types of water found in lakes, streams, rivers or oceans. The strainers 102, 104 can be fabricated using a variety of techniques including, forming, welding, machining, etc. The various components are also selected with keeping weight to an absolute minimum due to the applications it is intended to be used on.

The benefits of the sea strainer system include the ability to automatically clean the strainers with repeatability using the seawater itself as the cleaning mechanism in both forward flush crossflow and backflush mode in addition the selection of the lightest, economically feasible components which can insure the long-term reliability of this system in very harsh environments. The multimode cleaning cycles and the simplicity of a minimum of mechanically moving parts impart desirable reliability and effectiveness of the sea strainer system.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

What is claimed is:

1. A sea strainer system, comprising:
   a first strainer comprising a seawater inlet;
   a second strainer comprising a seawater inlet;
   a first cross-flow conduit coupled to each of the first and second strainers to fluidically couple together the first strainer and the second strainer, wherein the first cross-flow conduit is coupled to each of the first and second strainers in a different location than the seawater inlet of each of the first strainer and the second strainer;
   a first engine outlet conduit coupled to the first strainer to receive strained sea water from the first strainer, the first engine outlet conduit arranged such that strained seawater exiting from the first engine outlet conduit does not communicate with the second strainer;
   a second engine outlet conduit coupled to the second strainer to receive strained sea water from the second strainer, the second engine outlet conduit arranged such that strained seawater exiting from the second engine outlet conduit does not communicate with the first strainer;
   a crossover conduit fluidically connecting the first engine outlet conduit to the second engine outlet conduit;
   a first fluid control valve disposed in the first engine outlet conduit to control a flow of the strained seawater exiting from the first strainer;
   a second fluid control valve disposed in the second engine outlet conduit to control a flow of the strained seawater exiting from the second strainer;
   a third fluid control valve disposed in the first cross-flow conduit to control water flow into and out of the first strainer via the first cross-flow conduit; and
   a fourth fluid control valve disposed in the first cross-flow conduit to control water flow into and out of the second strainer via the first cross-flow conduit.

2. The sea strainer of claim 1, further comprising:
   a second cross-flow conduit coupled to each of the first and second strainers to fluidically couple together the first strainer and the second strainer; and
   a backflush pump fluidically coupled to each of the first strainer and the second strainer via a first pump conduit coupled to the first cross-flow conduit and via a second pump conduit coupled to the second cross-flow conduit.

3. The sea strainer of claim 2, wherein the first pump conduit is coupled to the first cross-flow conduit at a location between the third fluid control valve and the fourth fluid control valve.

4. The sea strainer of claim 2, further comprising:
   a fifth fluid control valve disposed in the second cross-flow conduit to control water flow into and out of the first strainer via the second cross-flow conduit; and
   a sixth fluid control valve disposed in the second cross-flow conduit to control water flow into and out of the second strainer via the second cross-flow conduit,
   wherein the second pump conduit is coupled to the second cross-flow conduit at a location between the fifth fluid control valve and the sixth fluid control valve.

5. The sea strainer of claim 2, further comprising a variable speed drive coupled to the backflush pump.

6. The sea strainer of claim 2, further comprising a fire pump outlet disposed on the second cross-flow conduit.

7. The sea strainer of claim 1, further comprising:
   a seventh fluid control valve disposed in the crossover conduit to control water flow out of the first engine outlet conduit; and
   an eighth fluid control valve disposed in the crossover conduit to control water flow out of the second engine outlet conduit.

8. The sea strainer of claim 1, wherein at least one of the first and second strainers comprises a window provided to a sidewall thereof to permit viewing of an interior condition of the strainer.

9. The sea strainer of claim 1, further comprising a programmable logic controller coupled to each of the first fluid control valve, the second fluid control valve, the third fluid control valve and the fourth fluid control valve.

10. A sea strainer system, comprising:
a first strainer comprising a first longitudinal end, a second longitudinal end opposite the first longitudinal end, a sidewall spanning between the first and second longitudinal ends, and a seawater inlet disposed on the first longitudinal end;
a second strainer comprising a first longitudinal end, a second longitudinal end opposite the first longitudinal end, a sidewall spanning between the first and second longitudinal ends, and a seawater inlet disposed on the first longitudinal end;
a first cross-flow conduit coupled to the second longitudinal end of each of the first and second strainers to fluidically couple together the first strainer and the second strainer;
a first engine outlet conduit coupled to the sidewall of the first strainer to output strained sea water from the first strainer;
a second engine outlet conduit coupled to the sidewall of the second strainer to output strained sea water from the second strainer;
a crossover conduit fluidically connecting the first engine outlet conduit to the second engine outlet conduit;
a first fluid control valve disposed in the first engine outlet conduit to control a flow of the strained seawater exiting from the first strainer;
a second fluid control valve disposed in the second engine outlet conduit to control a flow of the strained seawater exiting from the second strainer;
a third fluid control valve disposed in the first cross-flow conduit to control water flow into and out of the first strainer via the first cross-flow conduit; and
a fourth fluid control valve disposed in the first cross-flow conduit to control water flow into and out of the second strainer via the first cross-flow conduit.

11. The sea strainer of claim 10, further comprising:
a second cross-flow conduit coupled to each of the first and second strainers to fluidically couple together the first strainer and the second strainer; and
a backflush pump fluidically coupled to each of the first strainer and the second strainer via a first pump conduit coupled to the first cross-flow conduit and via a second pump conduit coupled to the second cross-flow conduit.

12. The sea strainer of claim 11, wherein the first pump conduit is coupled to the first cross-flow conduit at a location between the third fluid control valve and the fourth fluid control valve.

13. The sea strainer of claim 11, further comprising:
a fifth fluid control valve disposed in the second cross-flow conduit to control water flow into and out of the first strainer via the second cross-flow conduit; and
a sixth fluid control valve disposed in the second cross-flow conduit to control water flow into and out of the second strainer via the second cross-flow conduit,
wherein the second pump conduit is coupled to the second cross-flow conduit at a location between the fifth fluid control valve and the sixth fluid control valve.

14. The sea strainer of claim 11, further comprising a variable speed drive coupled to the backflush pump.

15. The sea strainer of claim 11, further comprising a fire pump outlet disposed on the second cross-flow conduit.

16. The sea strainer of claim 10, further comprising:
a seventh fluid control valve disposed in the crossover conduit to control water flow out of the first engine outlet conduit; and
an eighth fluid control valve disposed in the crossover conduit to control water flow out of the second engine outlet conduit.

17. The sea strainer of claim 10, wherein at least one of the first and second strainers comprises a window provided to a sidewall thereof to permit viewing of an interior condition of the strainer.

18. The sea strainer of claim 10, further comprising a programmable logic controller coupled to each of the first fluid control valve, the second fluid control valve, the third fluid control valve and the fourth fluid control valve.

* * * * *